(12) United States Patent
Ueda

(10) Patent No.: US 6,284,527 B1
(45) Date of Patent: Sep. 4, 2001

(54) METHOD FOR CONTINUOUSLY PROCESSING ORGANIC MATERIAL AND AN APPARATUS FOR CONDUCTING THE SAME METHOD

(76) Inventor: Yasuichi Ueda, 880-1 Aza Ohama, Motobu-cho, Kunigami-gun, Okinawa 905-0212 (JP)

( * ) Notice: Subject to any disclaimer, the term of this patent is extended or adjusted under 35 U.S.C. 154(b) by 0 days.

(21) Appl. No.: 09/311,660

(22) Filed: May 12, 1999

(51) Int. Cl.[7] .................................................. C12M 1/00
(52) U.S. Cl. ............................ 435/290.2; 435/290.3; 435/290.4; 435/294.1
(58) Field of Search ........................ 435/290.1, 290.2, 435/290.3, 290.4, 294.1

(56) References Cited

U.S. PATENT DOCUMENTS

| | | | |
|---|---|---|---|
| 5,559,033 | * | 9/1996 | Young ................................ 435/290.3 |
| 6,001,641 | * | 12/1999 | Posselius, Jr. ..................... 435/286.1 |
| 6,071,740 | * | 6/2000 | Kerouac ............................ 435/290.3 |

* cited by examiner

Primary Examiner—David A. Redding
(74) Attorney, Agent, or Firm—Leighton K. Chong

(57) ABSTRACT

A method for continuously processing organic material includes the steps of: (1) jointly disposing at least two fermenting tanks in series with at least one stirring apparatus and at least one temperature detector; (2) supplying a certain amount of processing material into the first fermenting tank; (3) detecting temperature in each of the fermenting tanks and controlling amount of half fermented material to be transferred from a fermenting tank positioned at upper stream to a fermenting tank positioned at lower stream such that the temperature in each of the fermenting tanks maintains at temperature of "final phase of fermentation heat rising period" or "constant temperature period"; and (4) discharging composted organic material from the last fermenting tank properly when the processing material has been composted. Therefore, fermentation progress of each of the fermenting tanks proceeds evenly, and the organic material is composted in short time using fermenting microorganism activation efficiently.

2 Claims, 19 Drawing Sheets

Change of Temperature in Fermenting Tank as Time Passed ("Fermentation Temperature Rising Period", "Constant Temperature Period" and "Declining Period")

Fig. 9 Change of Temperature When Raw Food Waste Was Added in "Fermentation Temperature Rising Period" in Fermenting Tank
(Relation between weight and temperature in fermenting tank)

Fig. 10 Change of Temperature When Raw Food Waste Was Added in "Fermentation Temperature Rising Period" in Fermenting Tank
(Relation between weight and temperature in fermenting tank)

Fig. 13 Relation between the Weight Transferred and Temperature in Fermenting Tank: Every 30 Minutes

METHOD FOR CONTINUOUSLY PROCESSING ORGANIC MATERIAL AND AN APPARATUS FOR CONDUCTING THE SAME METHOD

BACKGROUND OF THE INVENTION

The present invention is related to a method for continuously processing organic material which ferments and composts effectively and continuously organic matter such as left over food or raw food waste and an apparatus for conducting the same method.

Conventionally, a variety of food waste processing apparatus which compost raw food waste are known; thus, a small size apparatus for home use which is open at the bottom part and buried in the grounds, to which fermenting germ is added to ferment raw food waste by the germ, a middle size apparatus which has crushing /stirring apparatus inside thereof, or a large size apparatus for industrial use which has independent crushing apparatus, stirring apparatus and fermenting tank. However, the small size apparatus of the prior raw food waste processing apparatus has only a small processing ability and can fail to ferment caused by lack of temperature, and has a shortcoming of resulting in decomposition and infesting maggots. The middle size one has necessity for the capacity of the fermenting tank to become five to ten times bigger than its processing ability of raw food waste which yields everyday. It also has a shortcoming of insufficient fermentation caused by additionally supplying raw food waste into the fermenting tank. Such supplying is usually conducted without taking account of microorganism's activation inside of the fermenting tank. Further, the large size one has a shortcoming of necessity of man management which results in high facility and maintenance costs.

Accordingly, for example, business facilities yielding a huge amount of raw food waste such as meal supplying center and restaurants have a problem of too much burden for self-processing by establishing such large size raw food waste processing apparatus. So, these business facilities generally rely on specialized processing traders or collection of hog raisers who use the waste to feed pigs.

But recently, less leftover food is used to feed pigs, and hog raisers themselves are decreased in large numbers. With the decrease of these collecting traders, it has been more and more difficult to proceed raw food waste fast, and moreover new problems related to processing raw food waste have emerged.

For example, when raw food waste is incinerated, many problems occur. For example, a problem of dregs after the incineration, an offensive odor at incinerator and its surrounding areas, a problem of environment contamination such as flies and smoke, and a social problem promoting production of dioxin, a poisonous substance because raw food waste prevents temperature from rising in incinerator.

The aim of the present invention is to solve these problems of the prior raw food waste processing apparatus. Further, it is to provide a method for continuously processing organic material and an apparatus for conducting the same method in which steps from crushing organic material such as raw food waste to composting are automated and continuously proceeded in the best fermentation conditions without interruption. With the invention, more processing ability than capacity of fermenting tank can be obtained, facility and running costs dramatically decreases, and it is capable of being adopted from small size to large size ones.

DESCRIPTION OF THE INVENTION

The present invention solving said problems provides a method for continuously processing organic material, which comprises the steps of:

jointly disposing at least two fermenting tanks in series with at least one stirring apparatus and at least one temperature detector;

supplying a certain amount of processing material into the first fermenting tank, said processing material being made by stirring and crushing fermentation promoting agent in which microorganism is implanted in advance within organic material such as raw food waste;

detecting temperature in each of the fermenting tanks and controlling amount of the half fermented material to be transferred from the fermenting tank positioned at upper stream to the fermenting tank positioned at lower stream such that the temperature in each of said fermenting tanks maintains at temperature of "final phase of fermentation heat rising period" or "constant temperature period"; and discharging composted organic material from the last fermenting tank properly when the processing material has been composted.

At least two fermenting tanks are disposed in series so fermentation progress of each of the fermenting tanks proceeds evenly. While the amount of the half fermented material to be transferred from the fermenting tank positioned at upper stream to the fermenting tank positioned at lower stream is adjusted or controlled to maintain temperature of each of the fermenting tanks at temperature of "final phase of fermentation heat rising period" or "constant temperature period" the organic material is composted in short time by using fermenting microorganism activation efficiently. Accordingly, the organic material is continuously fermented.

The invention also resides in a method for continuously processing organic material as stated, and further including a fermentation preparing step prior to said step of supplying a certain amount of processing material into the first fermenting tank, said fermentation preparing step including supplying a predetermined amount of the processing material into each of the fermenting tanks and fermenting it so that temperature in each of the fermenting tanks reaches at temperature of "final phase of fermentation heat rising period" or "constant temperature period"

When preparing to start the method of the present invention, a certain amount of the processing material made of the stirred and crushed fermentation promoting agent and organic material is supplied into each of the fermenting tanks and, by fermenting it, the temperature in each of the fermenting tanks reaches at temperature of "final phase of fermentation heat rising period" or "constant temperature period". Except the start-up time, this fermentation preparing step in each of the fermenting tanks is not necessary because the processing material which has fermented to a certain level of fermentation is supplied to the fermenting tank successively, and accordingly, the time needed for fermentation process becomes short.

The invention further resides in a method for continuously processing organic material as stated, wherein said step of supplying a certain amount of the processing material comprises a step of randomly dumping the organic material which yields everyday as household raw waste into a high capacity tank in which the fermentation promoting agent has been provided, stirring and crushing it, and the supplying step is conducted under the condition where the processing material is half fermented to reach at the temperature of "final phase of fermentation heat rising period" or "constant temperature period".

The high capacity tank, which is separately disposed from the fermenting tanks, is provided to be randomly supplied with the organic material yielding everyday, to stir and crush it, so the organic material is fermented or half fermented to a certain level. Composting step takes place after the processing material is supplied in the fermenting tank where temperature management is carried out, so failure in the fermentation does not occur.

The invention further resides in a method for continuously processing organic material as stated, wherein the high capacity tank includes a storage tank body in which the organic material yielding everyday is dumped and an organic material dumping apparatus which the organic material is dumped into the storage tank body while it drains water, and inside of the storage tank body are provided a stirring pipe with which crushing holes are formed and a stirring screw located in the stirring pipe which sends up the accumulated organic material on the bottom of the storage tank body and scatters some through the crushing holes of the stirring pipe and other through the upper end of the stirring pipe into the storage tank body again.

The organic material supplying apparatus first removes water to a certain level from the organic material to be proceeded, and the drained organic material is supplied into the storage tank body. In the storage tank body, the fermenting microorganism is self-reproducing successively and it is stirred and crushed with the supplied organic material. The stirring screw is rotated in the stirring pipe, and sends up the accumulated organic material on the bottom of the storage tank body into the stirring pipe. The stirring screw pushes out some through the crushing holes of the stirring pipe with a certain amount of pressure and other through the upper end of the stirring pipe to scatter into the storage tank body again. By repeating or continuing this step, the processing material is mixed and crushed thoroughly and in the meantime, half fermented as time passed.

The second aspect of the present invention is an apparatus for continuously processing organic material, the apparatus comprises:

- at least two fermenting tanks disposed in series to each other, each of the fermenting tanks having at least one stirring apparatus and at least one temperature detector;
- a tank for stirring and crushing fermentation promoting agent in which fermenting microorganism is implanted and organic material such as raw food waste, and thereafter supplying a certain amount of the processing material of the half fermented material, temperature of which being at "final phase of fermentation heat rising period" or "constant temperature period", into the first fermenting tank;
- transferring conveyer which transfers the half fermented material from the fermenting tank positioned at upper stream to the fermenting tank positioned at lower stream and can adjust amount of the processing material to be transferred;
- a controller which detects temperature in each of the fermenting tanks and adjust amount of the half fermented material to be transferred from the fermenting tank positioned at upper stream to the fermenting tank positioned at lower stream such that the temperature in each of the fermenting tanks maintains at temperature of "final phase of fermentation heat rising period" or "constant temperature period"; and
- a discharging apparatus which discharges the composted organic material from the last fermenting tank properly when the processing material has been composted.

The invention described in claim 6 resides in an apparatus for continuously processing organic material as stated in claim 5, wherein the tank includes a high capacity storage tank body which has more capacity than the organic material to be dumped which yields everyday and an organic material dumping apparatus in which the organic material is dumped into the storage tank body while it drains water, inside of the storage tank body are provided a stirring pipe formed with crushing holes and a stirring screw located in the stirring pipe which sends up the accumulated organic material on the bottom of the storage tank body and scatter some through the crushing holes of the stirring pipe and other through the upper end of the stirring pipe into the storage tank body again.

The invention further resides in an apparatus for continuously processing organic material as stated, wherein the tank includes a high capacity storage tank body which has more capacity than the organic material to be dumped which yields everyday and an organic material dumping apparatus in which the organic material is dumped into the storage tank body while it drains water, and the storage tank body is comprised of an upper cylindrical part and a lower cut-end conic part which tapers off and is closed at the bottom by a bottom wall, and inside of the storage tank body are located an inner pipe having a small diameter going up from a certain point above the center of the bottom wall, a mesh cylinder having a large diameter jointly located at the upper end of the inner pipe, a rotation axis which goes through from the bottom wall to the upper end of the mesh cylinder, the rotation axis having a spiral wing capable of raising the accumulated organic material at the cut-end conic part to the mesh cylinder, cutter members fixed at proper points of the rim of the spiral wing, and cutter die members fixed to inside of the mesh cylinder and positioned next to the cutter members.

These and other objects and advantages of the present invention will no doubt become obvious to those of ordinary skilled in the art after having read the following detailed description of the preferred embodiments as illustrated in the various drawing figures.

DESCRIPTION OF THE PREFERRED EMBODIMENTS

Figure 1:
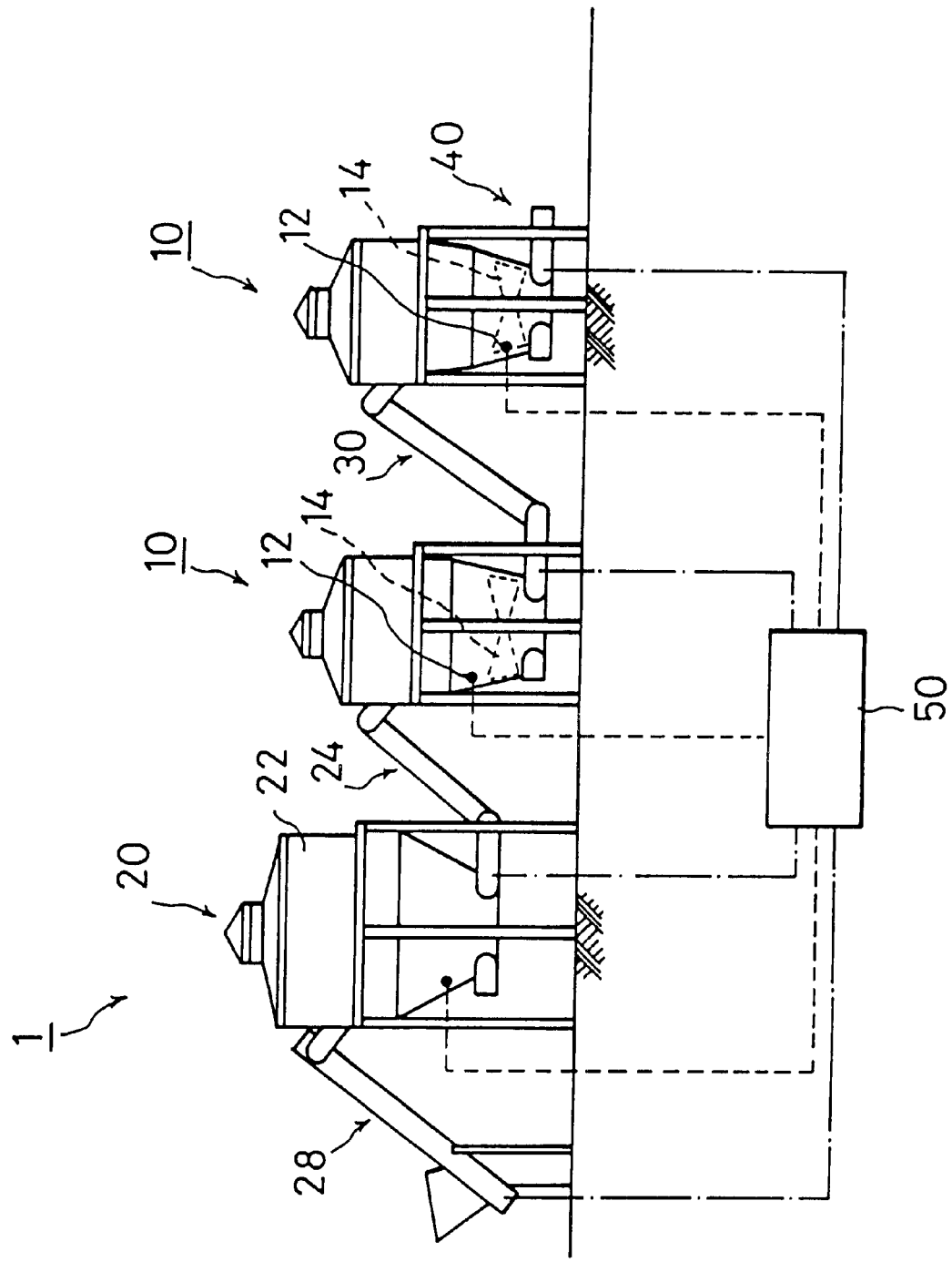
FIG. 1 is a schematic view of an embodiment of an apparatus for continuously processing organic material in accordance with the present invention.

FIG. 1 is a schematic view showing a preferred embodiment of an apparatus for continuously processing organic material in accordance with the present invention.

The apparatus 1 for continuously processing organic material according to the present invention is schematically comprised of at least two fermenting tanks 10 disposed in series to each other, supplying apparatus 20 which supplies a certain amount of the half fermented processing material into the first fermenting tank 10, transferring screw conveyer 30 which transfers the half fermented processing material from the fermenting tank 10 positioned at upper stream to the fermenting tank 10 positioned at lower stream, controlling apparatus 50 which detects temperature in each of the fermenting tanks 10, and at the same time, controls or adjusts amount of the processing material to be transferred, and discharging apparatus 40 which discharges the composted organic material from the last fermenting tank 10 properly.

Figure 2A:
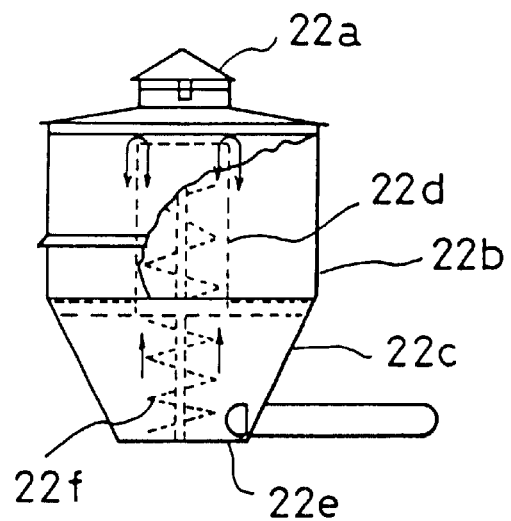
FIG. 2A is a partial cross sectional front view of the supplying apparatus shown in FIG. 1

In the drawings, the supplying apparatus 20 is used as a raw food waste processing apparatus as shown in FIG. 2A in details. But, any apparatus may be used if it can stir and crush the fermentation promoting agent and the organic material such as raw food waste, and supply a certain amount of the half fermented processing material into the first fermenting tank. Within this fermentation promoting agent, fermenting microorganism has been implanted. The supplying apparatus 20 has a high capacity storage tank body 22 and an organic material dumping apparatus 28. The high capacity storage tank body 22 has more capacity than the organic material yielding everyday and supplied in properly. The organic material dumping apparatus 28 drains and supplies the organic material into the storage tank body 22. The storage tank body 22 is comprised of a cylindrical water evaporating part 22b having an exhaust pipe 22a at the top, and under it, an accumulating part 22c which tapers off and is closed at the bottom by a bottom wall 22e. Inside the storage tank body 22 a stirring pipe 22d formed with many crushing holes 22g is located. A stirring screw 22f is rotatably located in the stirring pipe 22d.

Figure 2B:
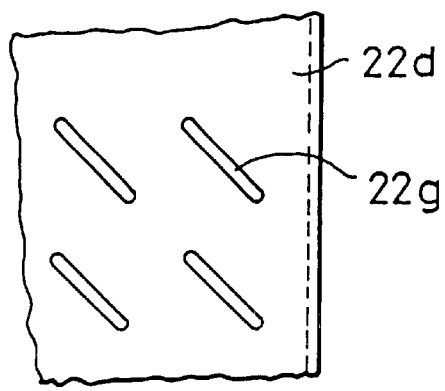
FIG. 2B is a partial enlarged front view of a stirring pipe located therein.

The crushing holes 22g is inclined to horizontal direction of 45 degrees as shown in details in FIG. 2B, and the processing material sent up in the stirring pipe 22d by the stirring screw 22f is pushed out from the crushing holes 22g with a certain pressure and crushed. The stirring screw 22f has the same upper end height as that of the stirring pipe 22d, and lower end having the screw wing which goes through lower opening part of the stirring pipe 22d and extends near the bottom wall 22e of the storage tank body 22. Accordingly, the organic material accumulated in the lower part of the storage tank body 22 is raised to scatter some though the crushing holes 22g of the stirring pipe 22d and the other through the upper end of the stirring pipe 22d into the storage tank body 22 again.

Figure 3:
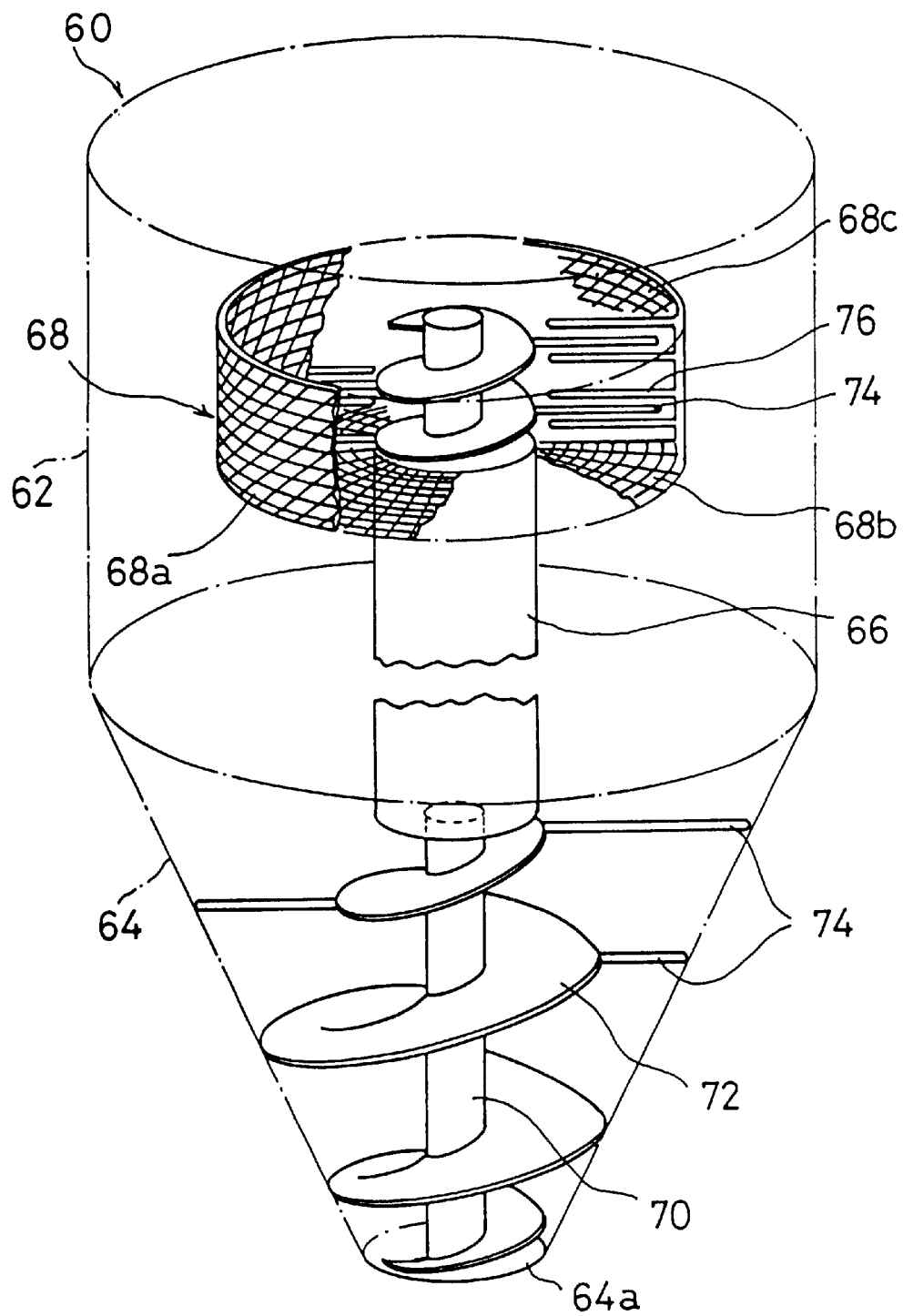
FIG. 3 is a schematic diagonal view of another embodiment of supplying apparatus as shown in FIG. 1.

In FIG. 3, another embodiment of the supplying apparatus is shown. In this embodiment, a storage tank body 60 is comprised of an upper cylindrical part 62 and a lower cut-end conic part 64 which tapers off and is closed at the bottom by a bottom wall 64a, and has same structure as the storage tank body 22 of the supplying apparatus 20. Inside of the storage tank body 60, an inner pipe 66 having a small diameter is located. The inner pipe 66 goes up from a certain point above the center of the bottom wall 64a. The inner pipe 66 does not have any holes or other openings. A mesh cylinder 68 having a large diameter is located jointly at the upper end of the inner pipe 66. The mesh cylinder 68 has a cylindrical side surface 68c, a circular bottom surface 68b and a circular top surface 68c, all of them being made of mesh members.

Further, a rotation axis 70 which goes through from the bottom wall 64a to the upper end of the mesh cylinder 68 has a spiral wing 72 capable of raising the accumulated organic material at the cut-end conic part 64 to the mesh cylinder 68. Width of the spiral wing 72 extends to come in contact with the inner surface at the lower half of the cut-end conic part 64, and at the remaining part it extends to come in contact with the inner surface of the inner pipe 66. Cutter members 74 are fixed at the proper points of the rim of the spiral wing 72, and cutter die members 76 are fixed to inside of the mesh cylinder 68 and positioned next to the cutter members 74. By cutting function between the cutter members 74 and the cutter die members 76 and by crushing function when going through the mesh cylinder 68, the processing material is stirred and crushed very well.

The organic material dumping apparatus 28 is comprised of a hopper 28a which has a vibration feeder at its lower end and a screw conveyer 28b which carries the raw food waste supplied in the hopper 28a to an opening located at a certain point of the storage tank body 22. Water included in the raw food waste is separated from the waste at the hopper 28a and the screw conveyer 28b. Water then is sent to a drainage processing facility. On the other hand, a certain amount of water, for example, 30 weight / % of water included in solid waste is sent to the storage tank body 22.

The half fermented processing material is supplied to the first fermenting tank 10 by the supplying conveyer 24 when the processing material reaches at temperature of "final phase of fermentation heat rising period" or "constant temperature period". This half fermented processing material is obtained by stirring the organic material and the fermentation promoting agent which has already implanted fermenting microorganism and by crushing it within the storage tank body 22.

The fermenting tank 10 is enough to have at least one stirring apparatus 14 and one temperature sensor 12 because the processing material has been crushed thoroughly in the fermenting apparatus 20. But, of course, the fermenting tank 10 may have a crushing structure to crush the processing material more thoroughly. Output of the temperature sensor 12 is transmitted to the controlling apparatus 50, so it controls or adjusts amount of the half fermented material to be transferred from the fermenting tank positioned at upper stream to the fermenting tank positioned at lower stream by a screw conveyer 30. During this period, temperature in each of the fermenting tanks 10 maintains at temperature of "final phase of fermentation heat rising period" or "constant temperature period". The stirring apparatus 14 has a motor driven spiral wing at the bottom of the fermenting tank 10.

Discharging apparatus 40 discharges the composted organic material accumulated on the bottom of the last fermenting tank 10 properly.

Figure 4:
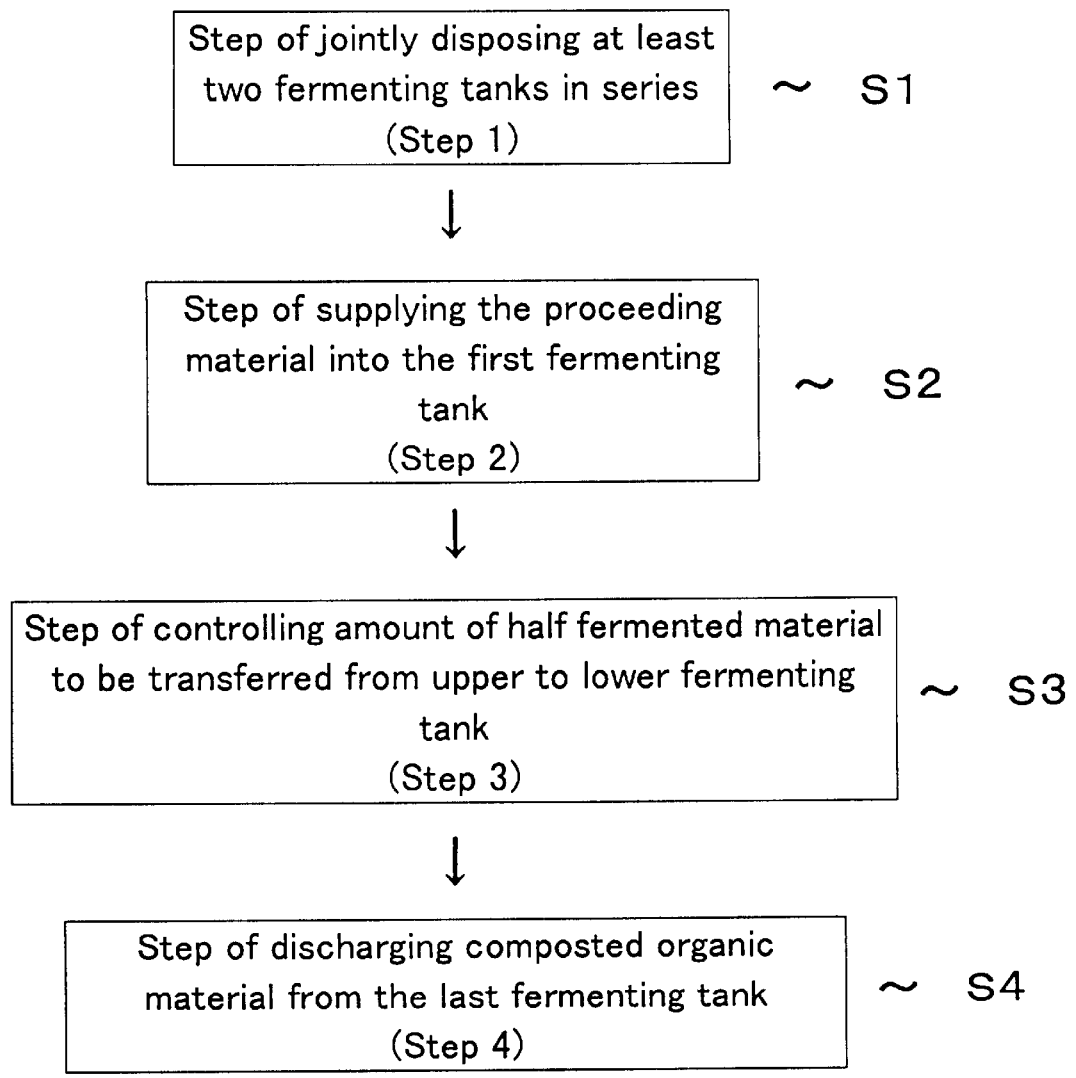
FIG. 4 is a flow chart showing a method for continuously processing organic material in accordance with the present invention.

Next, a method for continuously processing organic material in accordance with the present invention is explained with using FIG. 4.

The method for continuously processing organic material according to the present invention schematically comprises steps of jointly disposing fermenting tanks in series (Step S1), supplying a certain amount of processing material to the first fermenting tank 10 (Step S2), adjusting or controlling amount of the processing material to be transferred from the fermenting tank 10 positioned upper stream to the fermenting tank 10 positioned lower stream (Step S3), and discharging the compost from the last fermenting tank 10 (Step S4).

As Step S1, at least two fermenting tanks 10 having a stirring apparatus 14 and temperature detecting sensors 12 are disposed jointly in series. Since at least two fermenting tanks 10 are disposed in series, fermentation progress of each of the fermenting tanks 10 can proceed evenly and, in the meantime, continuous fermentation becomes possible by sending the organic material from upper to lower successively with taking progress of the fermentation into consideration.

As Step S2, a certain amount of the processing material which is made by stirring and crushing the fermentation promoting agent, in which fermenting microorganism has been implanted, and the organic material such as raw food waste is supplied to the first fermenting tank 10. Stirring and crushing the fermentation promoting agent and the organic material can be proceeded in a high capacity tank 20 including the fermentation promoting agent. In the tank 20, the organic material yielding everyday is supplied or dumped randomly and stirred and crushed, and the material is fully fermented or half fermented to a certain level. Composting is proceeded in the fermenting tank 10 under temperature management or control, so fermentation failure does not occur. When the organic material yielding everyday is dumped into the high capacity tank 20, the organic material can be drained to a level that it has preferred water content rate suitable for the fermentation. Accordingly, it is possible to make suitable condition for the fermentation in the tank 20.

To promote stirring and crushing, inside the high capacity tank 20, the stirring pipe 22d with the crushing holes 22g and the stirring screw 22f which is located in the stirring pipe 22d may be disposed. The stirring screw 22f sends up the accumulated organic material on the bottom of the storage tank body 22 and scatters some through the crushing holes 22g of the stirring pipe 22d and other through the upper end of the stirring pipe 22d into the storage tank body 22 again.

By rotating the stirring screw 22f in the stirring pipe 22d, the organic material accumulated on the bottom of the storage tank body 22 is raised. Some of the organic material are pushed out from the crushing holes 22g of the stirring pipe 22d with using a certain amount of pressure and the other is scattered through the upper end of the stirring pipe 22d into the storage tank body 22 again. By repeating or continuing this step, the processing material is mixed and crushed thoroughly and meanwhile is half fermented as time passed.

Further, fermentation preparing step may be added before Step S2. It is a step of supplying a certain amount, for example, 80% of the capacity of the fermenting tank 10 of the processing material into each of the fermenting tanks 10 and fermenting it, respectively. Through this step, temperature in each of the fermenting tanks 10 reaches at temperature of "final phase of fermentation heat rising period" or "constant temperature period". This processing material is made by stirring and crushing the fermentation promoting agent and the organic material.

When starting the method of the present invention, a certain amount of the processing material made of the stirred and crushed fermentation promoting agent and the organic material is supplied or dumped into each of the fermenting tanks 10. By fermenting it in each of the fermenting tanks 10, the temperature in each of the fermenting tanks 10 reaches at temperature of "final phase of fermentation heat rising period" or "constant temperature period". Except the start-up time, the fermentation preparing process in each of the fermenting tanks 10 is not necessary because the processing material fermented to a certain fermentation level is supplied thereto successively. Accordingly, the time needed for the fermentation process becomes short.

As Step S3, temperature in each of the fermenting tanks 10 is detected. At the same time, amount of the half fermented material from the fermenting tank 10 positioned at upper stream to the fermenting tank 10 positioned at lower stream is controlled or adjusted to maintain at temperature of "final phase of fermentation heat rising period" or "constant temperature period" in the fermenting tank. By maintaining at temperature of "final phase of fermentation heat rising period" or "constant temperature period" in the fermenting tank 10, activation of the fermenting microorganism is highly maintained and the organic material is composted efficiently and in short time.

As Step S4, the composted organic material is discharged properly with using, for example, a discharging apparatus 40 from the last fermenting tank 10. The discharging step may be conducted by discharging a certain amount of the compost at each pre-determined period or discharging a small amount of the compost continuously.

Figure 5:
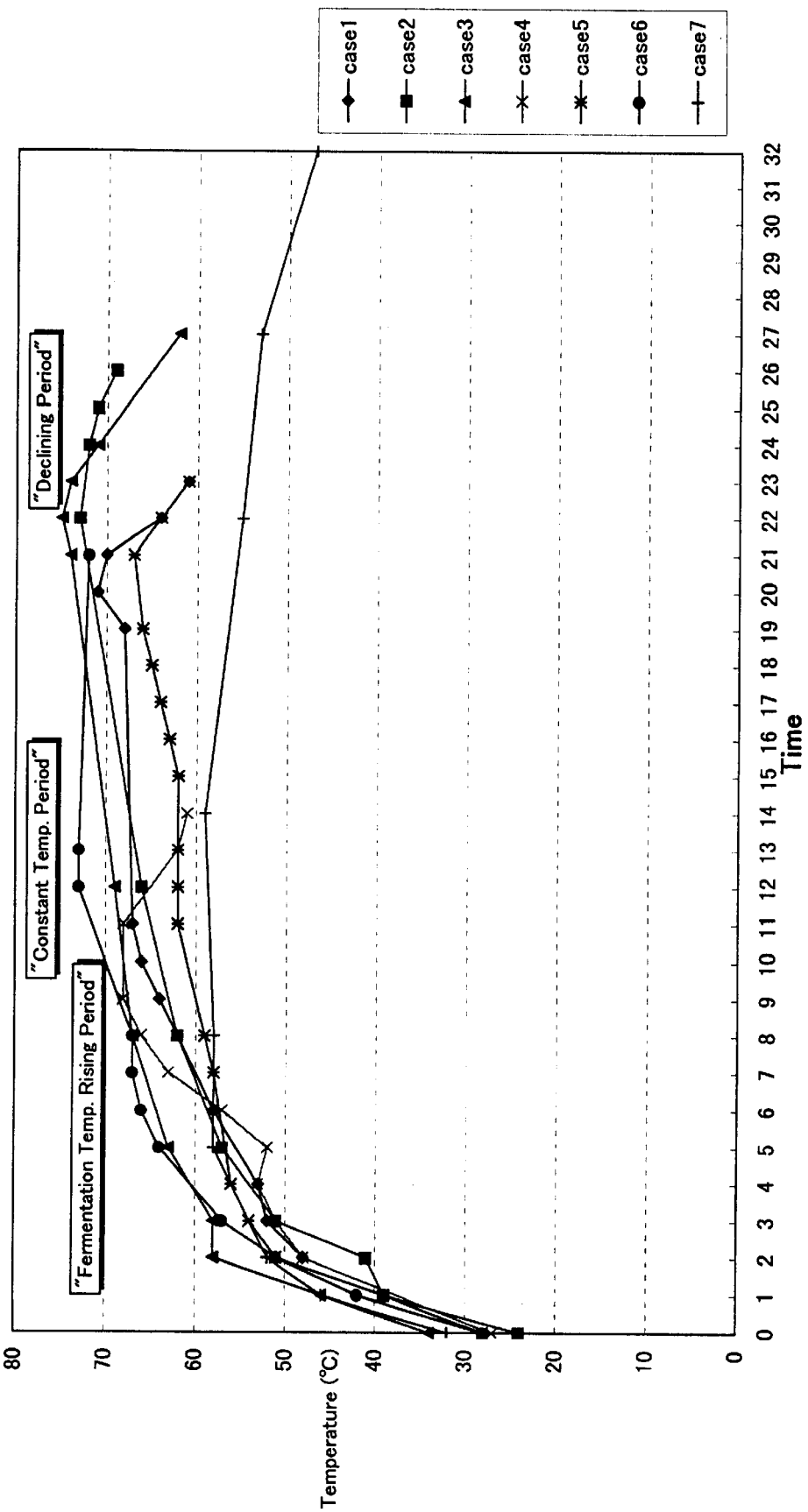
FIG. 5 is a graph showing change of temperature in fermenting tank as time passed.

With using a single fermenting tank 10, the raw food waste was dumped or supplied once, then stirred and crushed with the fermentation promoting agent, and fermented. Change of temperature inside the tank 10 (fermentation temperature) as time passed in this reference experiment is shown in Table 1 and FIG. 5. As in FIG. 5, it is known by those skilled in the art of microorganism fermentation that they refer a period when temperature inside the tank rises as "fermentation temperature rising period", a period thereafter when temperature is stable as "constant temperature period", and a period when fermentation ends and temperature drops as "declining period".

TABLE 1

Change of temperature in fermenting tank as time passed ("fermentation temperature rising period", "constant temperature period" and "declining period")

| No. TIME | I TEMP. | II TEMP. | III TEMP. | IV TEMP. | V TEMP. | VI TEMP. | VII TEMP. |
|---|---|---|---|---|---|---|---|
| 0 |  | 24 | 34 | 27 | 28 | 28 | 32 |
| 1 |  | 39 | 46 |  | 39 | 42 | 46 |
| 2 | 48 | 41 | 58 | 48 | 51 | 51 | 52 |
| 3 | 52 | 51 | 58 | 51 | 54 | 57 |  |
| 4 | 53 |  |  | 53 | 56 |  |  |
| 5 |  | 57 | 63 | 52 |  | 64 | 58 |
| 6 | 58 |  |  | 57 |  | 66 |  |
| 7 |  |  |  | 63 | 58 | 67 |  |
| 8 | 62 | 62 | 67 | 66 | 59 | 67 | 58 |
| 9 | 64 |  |  | 68 |  |  |  |
| 10 | 66 |  |  |  |  |  |  |
| 11 | 67 |  |  | 68 | 62 |  |  |
| 12 |  | 66 | 69 |  | 62 | 73 |  |
| 13 |  |  |  | 62 | 62 | 73 |  |
| 14 |  |  |  | 61 |  |  | 59 |
| 15 |  |  |  |  | 62 |  |  |
| 16 |  |  |  |  | 63 |  |  |
| 17 |  |  |  |  | 64 |  |  |
| 18 |  |  |  |  | 65 |  |  |
| 19 | 68 |  |  |  | 66 |  |  |
| 20 | 71 |  |  |  |  |  |  |
| 21 | 70 |  |  | 74 | 67 | 72 |  |
| 22 | 64 | 73 | 75 |  | 64 |  | 55 |
| 23 | 61 |  | 74 |  | 61 |  |  |
| 24 |  | 72 | 71 |  |  |  |  |
| 25 |  | 71 |  |  |  |  |  |
| 26 |  | 69 |  |  |  |  |  |
| 27 |  |  | 62 |  |  |  | 53 |
| 28 |  |  |  |  |  |  |  |
| 29 |  |  |  |  |  |  |  |
| 30 |  |  |  |  |  |  |  |
| 31 |  |  |  |  |  |  |  |
| 32 |  |  |  |  |  |  | 47 |

Figure 6:
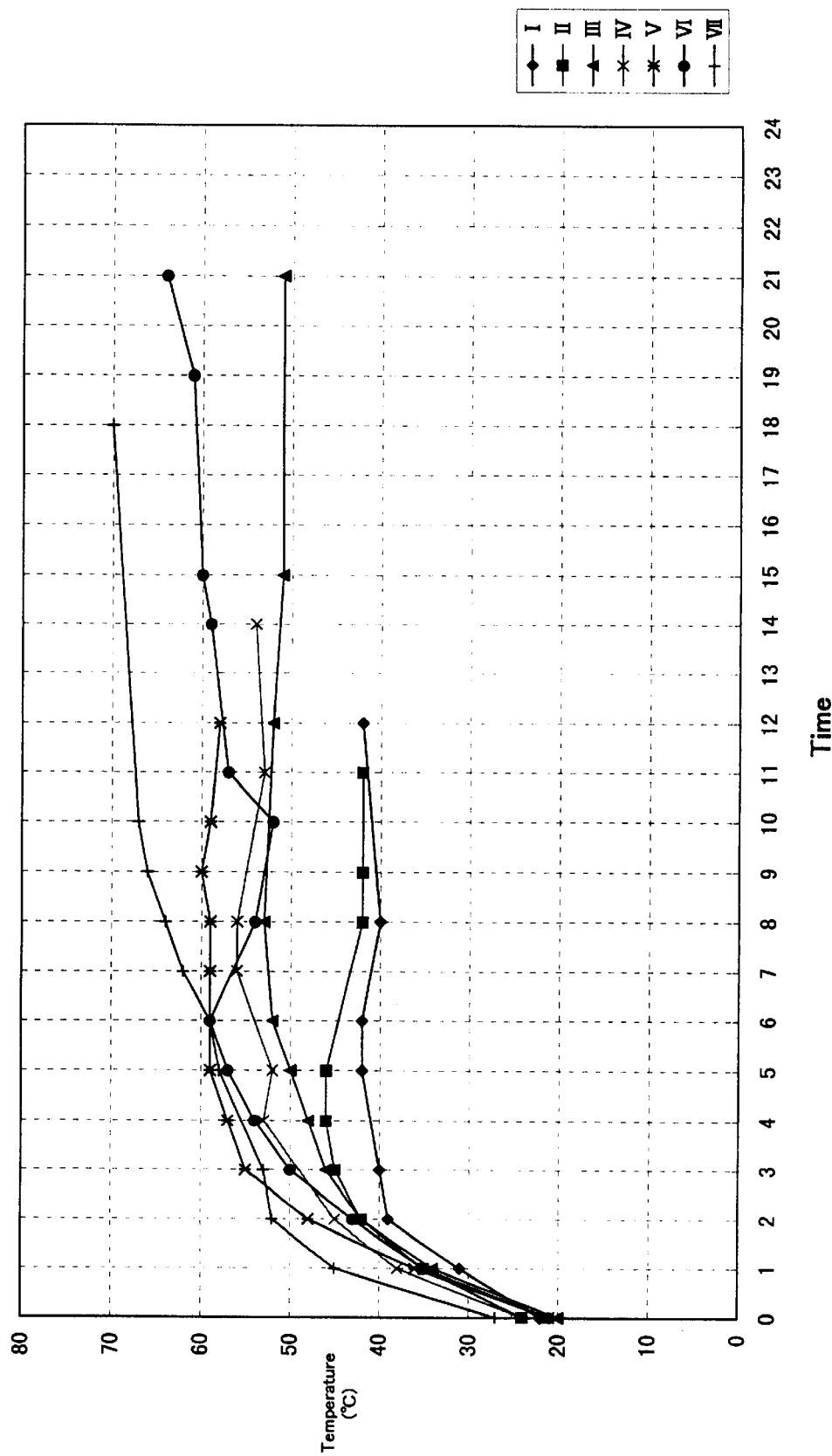
FIG. 6 is a graph showing change of temperature in fermenting tank as time passed.

According to another experiment under the same condition, temperature of "constant temperature period" extended in wide range from 40° C. to 70° C. depending on its fermentation condition as shown in Table 2 and FIG. 6. The reason why the prior raw food waste processing apparatus has unstable compost quality and sometimes has possibility to perish is that the temperatures of "constant temperature period" are not always the same and fermenting microorganism does not work well. In the prior raw food waste processing apparatus it takes an assumption that the organic material such as the raw food waste supplied to the fermenting tank 10 is automatically decomposed and composted. Further, the prior art apparatus has a shortcoming that an operator cannot estimate temperature of "constant temperature period" at start of the fermentation.

TABLE 2

Change of temperature in fermenting tank as time passed

| TIME/NO. | I | II | III | IV | V | VI | VII |
|---|---|---|---|---|---|---|---|
| 0 | 22 | 24 | 20 | 24 | 21 | 21 | 27 |
| 1 | 31 | 35 | 34 | 38 | 36 | 35 | 45 |
| 2 | 39 | 42 | 42 | 45 | 48 | 43 | 52 |
| 3 | 40 | 45 | 46 |  | 55 | 50 | 53 |
| 4 |  | 46 | 48 | 53 | 57 | 54 |  |
| 5 | 42 | 46 | 50 | 52 | 59 | 57 | 58 |
| 6 | 42 |  | 52 |  |  | 59 | 59 |
| 7 |  |  |  | 56 | 59 |  | 62 |
| 8 | 40 | 42 | 53 | 56 | 59 | 54 | 64 |
| 9 |  | 42 |  |  | 60 |  | 66 |
| 10 |  |  |  |  | 59 | 52 | 67 |
| 11 |  | 42 |  | 53 |  | 57 |  |

TABLE 2-continued

Change of temperature in fermenting tank as time passed

| TIME/NO. | I | II | III | IV | V | VI | VII |
|---|---|---|---|---|---|---|---|
| 12 | 42 |  | 52 |  | 58 |  |  |
| 13 |  |  |  |  |  |  |  |
| 14 |  |  |  | 54 |  | 59 |  |
| 15 |  |  | 51 |  |  | 60 |  |
| 16 |  |  |  |  |  |  |  |
| 17 |  |  |  |  |  |  |  |
| 18 |  |  |  |  |  |  | 70 |
| 19 |  |  |  |  |  | 61 |  |
| 20 |  |  |  |  |  |  |  |
| 21 |  |  | 51 |  |  | 64 |  |
| 22 |  |  |  |  |  |  |  |
| 23 |  |  |  |  |  |  |  |
| 24 |  |  |  |  |  |  |  |

Figure 7:
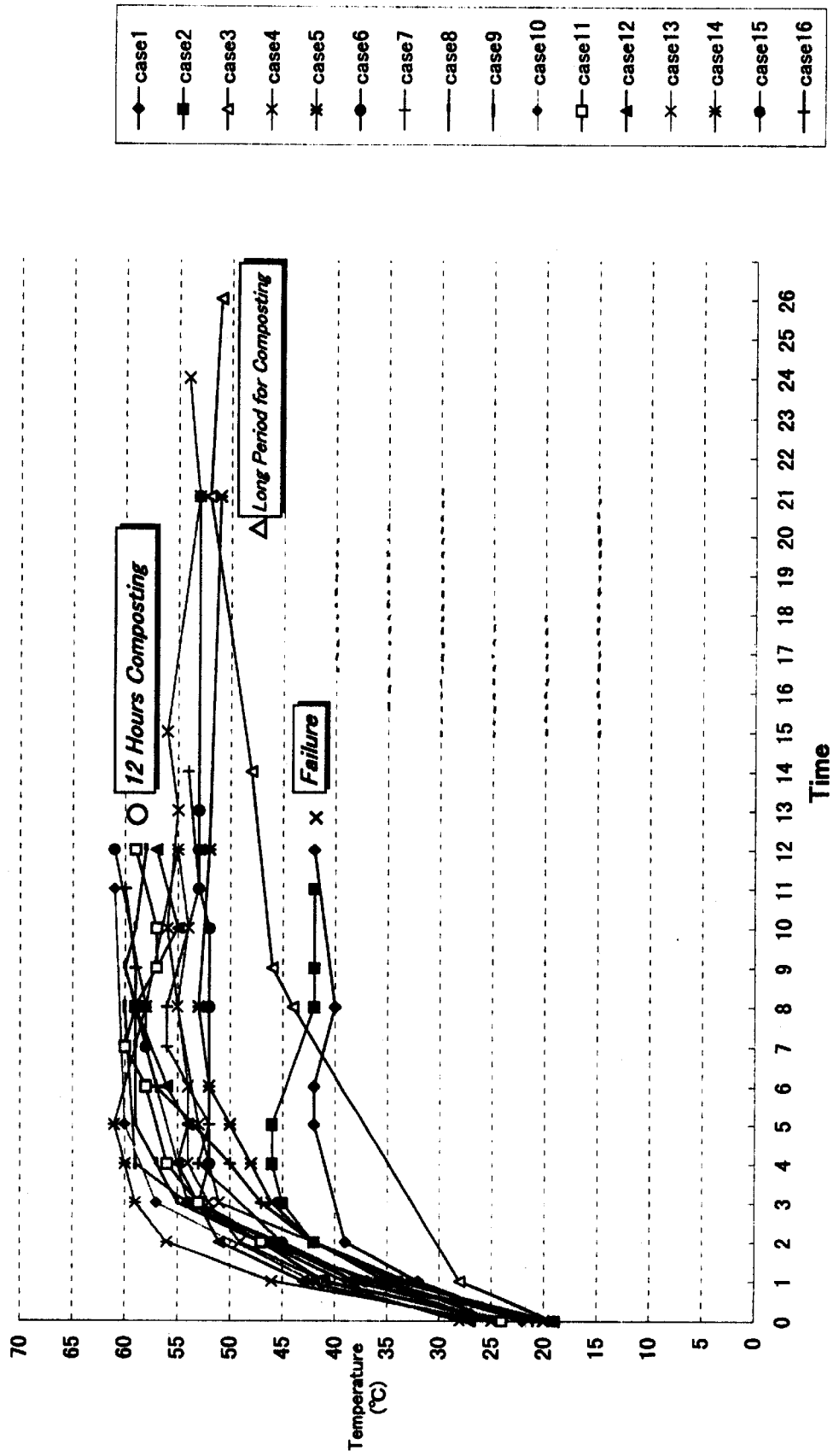
FIG. 7 is a graph showing change of temperature and time needed for composting.

According to still another experiment under the same condition, as shown in Table 3 and FIG. 7 if fermentation temperature was equal to or more than 55° C., the organic material was composted im about 12 hours. But if fermentation temperature was between 45° C. and 54° C., a long period of time was needed to compost the organic material. Besides, at temperature equal to or under 44° C., fermentation did not progress and composting ended in failure. In case of the low fermentation temperature, the prior raw food waste processing apparatus could not obtain increased temperature in the middle of the process, so the organic material was left as it was. Alternatively, the present process was repeated so that the organic material was stirred and crushed again with the fermentation promoting agent.

TABLE 3

Change of temperature in fermenting tank and time needed for composting

| No. | ① | ② | ③ | ④ | ⑤ | ⑥ | ⑦ | ⑧ |
|---|---|---|---|---|---|---|---|---|
| Amount Discharged | | | 13 | 21 | 20 | 19 | 21 | 25 |
| Completion Hours | Failure | Failure | 27 | 24 | 21 | 21 | 14 | 12 |
| Time/Amount Supplied | 283 | 208 | 341 | 609 | 485 | 347 | 507 | 478 |
| 0 | 22 | 24 | 19 | 19 | 20 | 24 | 24 | 21 |
| 1 | 32 | 35 | 28 | 34 | 34 | 38 | 38 | 36 |
| 2 | 39 | 42 | | 42 | 42 | 46 | 45 | 47 |
| 3 | | 45 | | 51 | 46 | 53 | | 55 |
| 4 | | 46 | | | 48 | 52 | 53 | 57 |
| 5 | 42 | 46 | | 53 | 50 | | 52 | 59 |
| 6 | 42 | | | | 52 | | | |
| 7 | | | | | | | 56 | 59 |
| 8 | 40 | 42 | 44 | 55 | 53 | 52 | 56 | 59 |
| 9 | | 42 | 46 | | | | | 60 |
| 10 | | | | 56 | | 52 | | 59 |
| 11 | | 42 | | | | 53 | 53 | |
| 12 | 42 | | | | 52 | 53 | | 58 |
| 13 | | | | 55 | | 53 | | |
| 14 | | | 48 | | | | 54 | |
| 15 | | | | 56 | | | | |
| 16 | | | | | | | | |
| 17 | | | | | | | | |
| 18 | | | | | | | | |
| 19 | | | | | | | | |
| 20 | | | | | | | | |
| 21 | | | 52 | 53 | 51 | 53 | | |
| 22 | | | | | | | | |
| 23 | | | | | | | | |
| 24 | | | | 54 | | | | |
| 25 | | | | | | | | |
| 26 | | | 51 | | | | | |
| Date | 4.7.1997 | 4.15.1997 | 3.24.1997 | 3.31.1997 | 4.9.1997 | 4.14.1997 | 4.12.1997 | 4.5.1997 |

| No. | ⑨ | ⑩ | ⑪ | ⑫ | ⑬ | ⑭ | ⑮ | ⑯ |
|---|---|---|---|---|---|---|---|---|
| Amount Discharged | 21 | 24 | 25 | | | 19 | 18 | 22 |
| Completion Hours | 12 | 12 | 12 | 12 | 12 | 12 | 12 | 11 |
| Time/Amount Supplied | 429 | 413 | 443 | 504 | 459 | 478 | 498 | 415 |
| 0 | 19 | 22 | 24 | 27 | 28 | 25 | 19 | 21 |
| 1 | 39 | 42 | 41 | 43 | 41 | 46 | 37 | 33 |
| 2 | 47 | | 47 | 51 | 49 | 56 | 45 | 42 |
| 3 | 54 | 57 | 53 | | 52 | 59 | 54 | 47 |
| 4 | 59 | | 56 | 55 | 54 | 60 | | 50 |
| 5 | | 60 | | 54 | | 61 | | |
| 6 | | | 58 | 56 | 54 | | | 57 |
| 7 | | | 60 | | | | 58 | |
| 8 | 60 | | 59 | 59 | 55 | 58 | 58 | 59 |
| 9 | | | 57 | | | | | 59 |
| 10 | | | 57 | 55 | 54 | | | |
| 11 | | 61 | | | | | | 60 |
| 12 | | | 59 | 57 | 55 | 55 | 61 | |
| 13 | | | | | | | | |
| 14 | | | | | | | | |
| 15 | | | | | | | | |
| 16 | | | | | | | | |
| 17 | | | | | | | | |
| 18 | | | | | | | | |
| 19 | | | | | | | | |
| 20 | | | | | | | | |
| 21 | | | | | | | | |
| 22 | | | | | | | | |
| 23 | | | | | | | | |
| 24 | | | | | | | | |
| 25 | | | | | | | | |
| 26 | | | | | | | | |
| Date | 4.10.1997 | 4.11.1997 | 4.17.1997 | 4.18.1997 | 4.19.1997 | 4.2.1997 | 3.27.1997 | 4.13.1997 |

Figure 8:
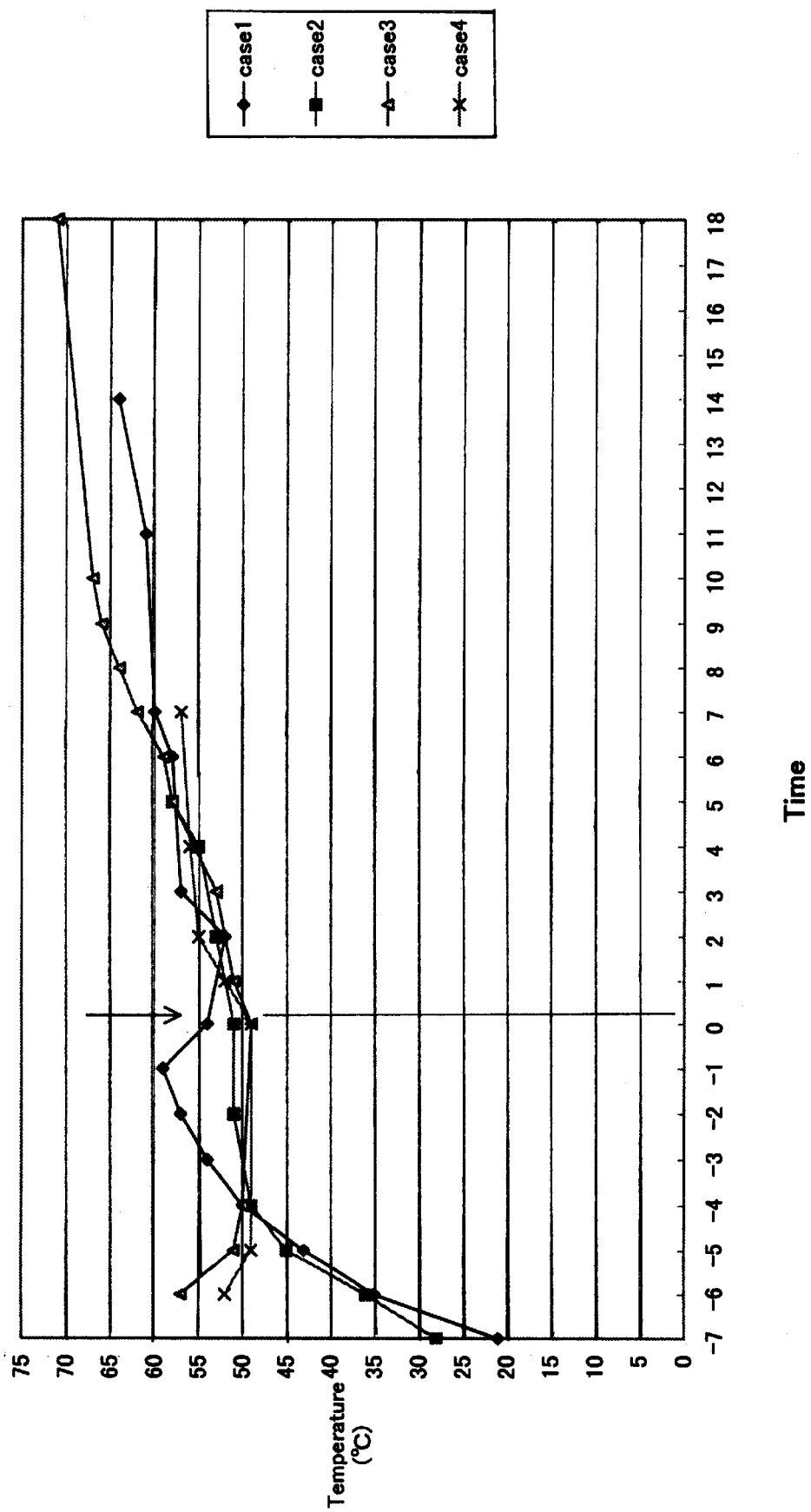
FIG. 8 is a graph showing activation of fermenting microorganism in fermenting tank.

In case that fermentation temperature was equal to or less than 55° C., the same amount of the fermentation promoting agent was supplied or dumped into the fermentation tank 10 and stirred. In this case, as shown in Table 4 and FIG. 8, temperature in the fermenting tank 10 rose to 55° C. or more after the first half of "fermentation temperature rising period". Besides, FIG. 8 shown change of temperature in the fermenting tank 10 when the same amount of the fermenting microorganism as that of the initial supply is added at time zero (0).

The feature of the present invention resides in the point that temperature in the fermenting tank is kept equal to or more than 55° C. That is to say, it maintains at temperature, which is possible to use activation of the fermenting microorganism efficiently, by detecting temperature in each of the fermenting tanks 10 and controlling or adjusting amount of the processing material supplied into each of the fermenting tanks 10.

TABLE 4

Activation of fermenting microorganism in fermenting tank
(Temperature in the fermenting tank rose to 55° C. or more after
the first half of "fermentation temperature rising period
(under 55° C.)", when the same amount of the fermenting
microorganism as that of the initial supply was
added at time zero (0))

| TIME | ① TEMP. | ② TEMP. | ③ TEMP. | ④ TEMP. |
|---|---|---|---|---|
|  | 21 | 28 |  |  |
| 1 | 35 | 36 | 57 | 52 |
| 2 | 43 | 45 | 51 | 49 |
| 3 | 50 | 49 | 50 | 49 |
| 4 | 54 |  | 49 | 52 |
| 5 | 57 | 51 | 51 | 55 |
| 6 | 59 |  |  |  |
| 7 |  | 51 | 53 | 56 |
| 8 | 54 |  |  |  |
| 9 |  | 53 | 58 |  |
| 10 | 52 |  | 59 | 57 |
| 11 | 57 | 55 | 62 |  |
| 12 |  | 58 | 64 |  |
| 13 |  |  | 66 |  |
| 14 | 58 |  | 67 |  |
| 15 | 60 |  |  |  |
| 16 |  |  |  |  |
| 17 |  |  |  |  |
| 18 |  |  |  |  |
| 19 | 61 |  |  |  |
| 20 |  |  |  |  |
| 21 |  |  |  |  |
| 22 | 64 |  | 71 |  |
| 23 |  |  |  |  |
| 24 |  |  |  |  |
| DATE | 4.16.1997 | 4.19.1997 | 4.21.1997 | 4.21.1997 |

Figure 9:
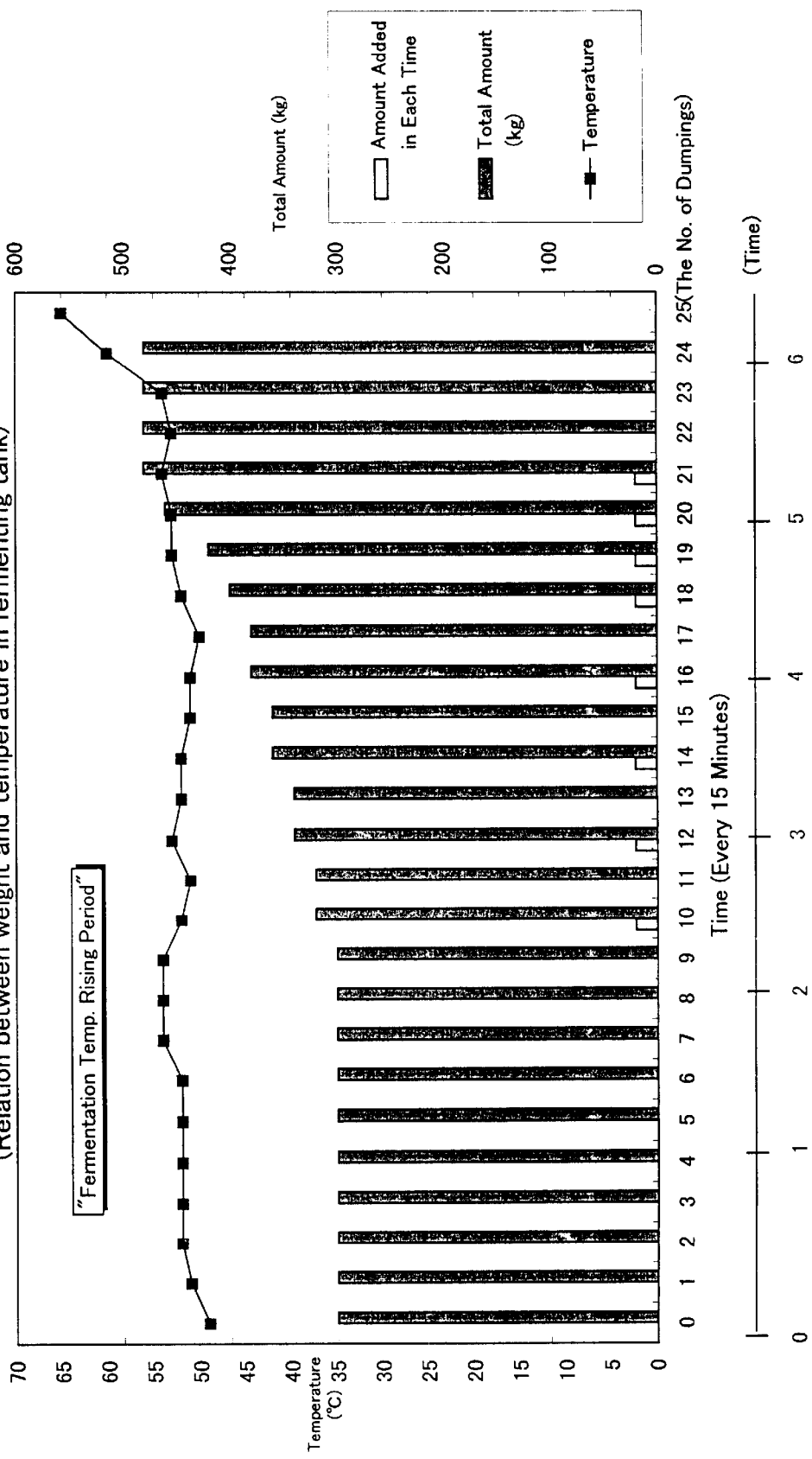
FIG. 9 is a graph showing relation between weight and temperature in fermenting tank.
Figure 10:
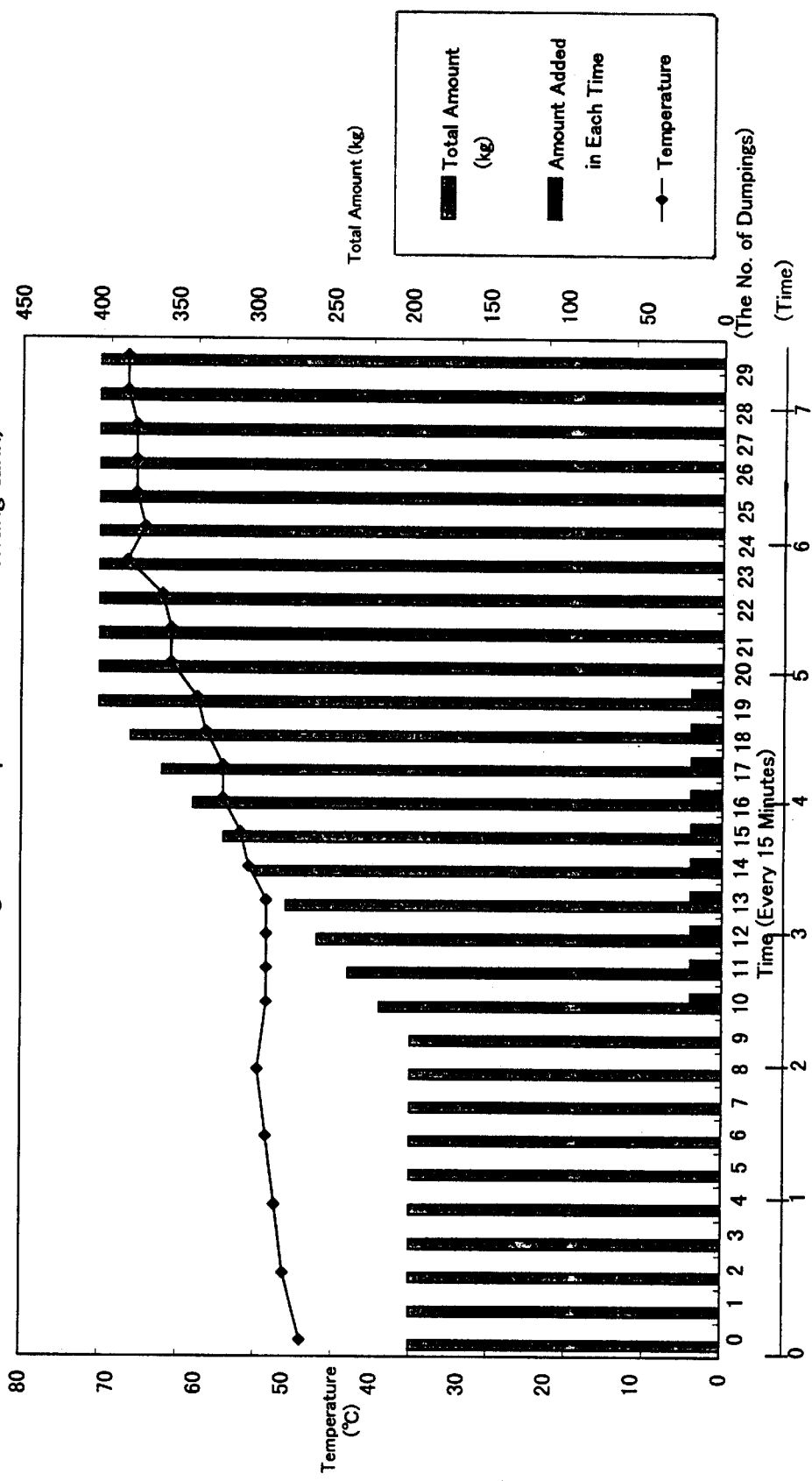
FIG. 10 is a graph showing relation between weight and temperature in fermenting tank.
Figure 11:
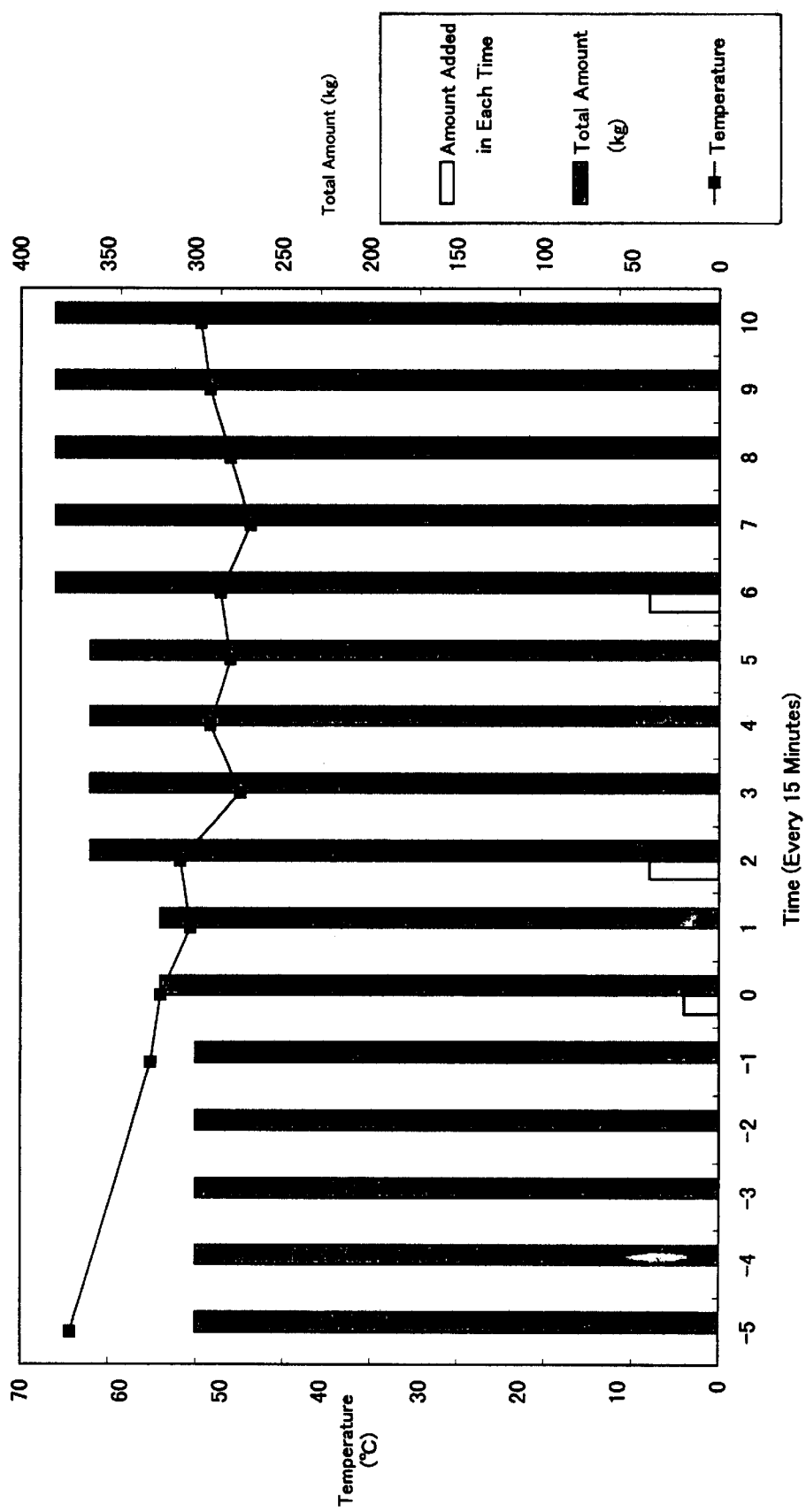
FIG. 11 is a graph showing change of temperature when raw food waste is added in temperature declining period in fermenting tank.
Figure 12:
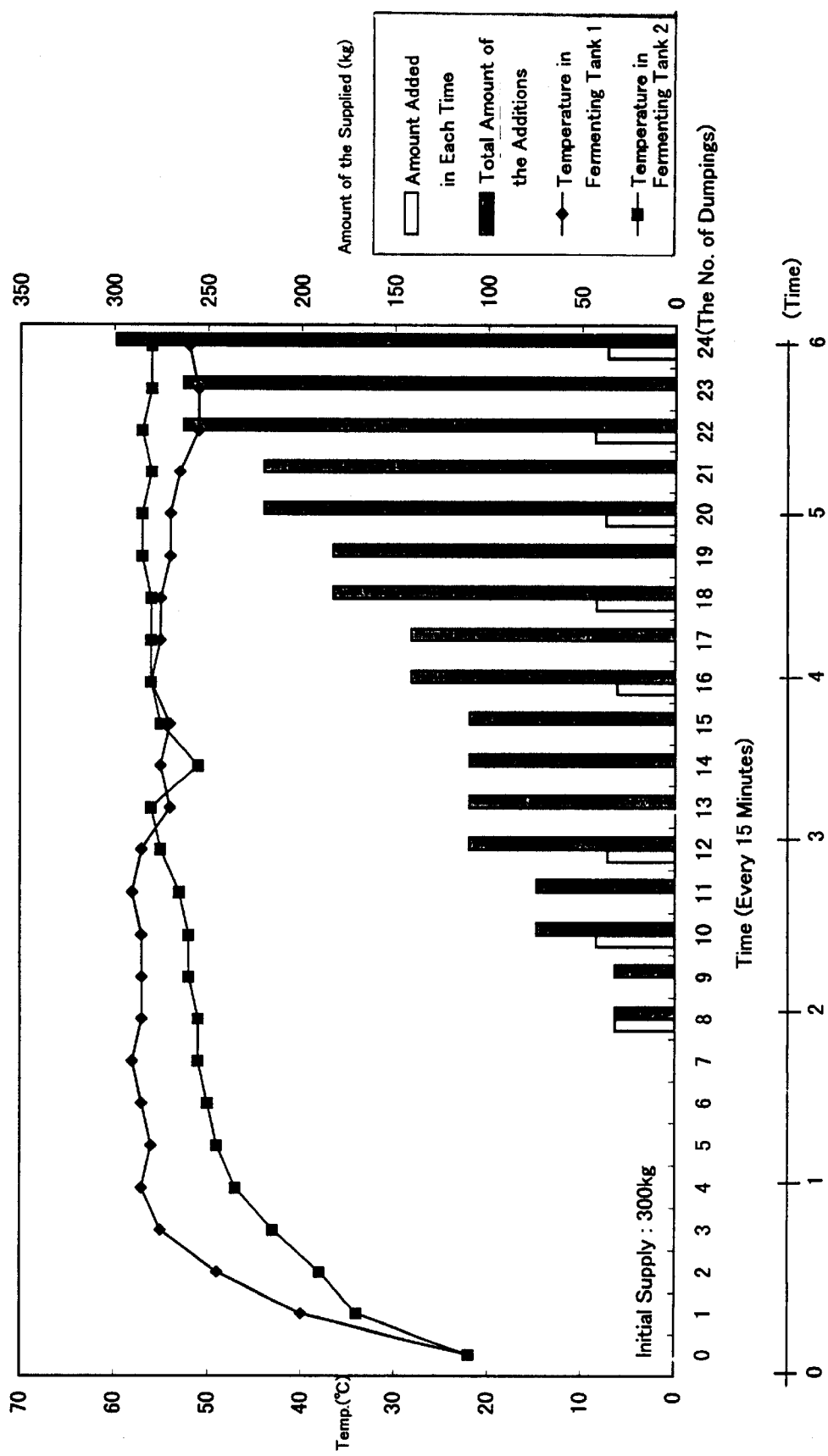
FIG. 12 is a graph showing relation between supplied amount and temperature in fermenting tank when the organic material is added in every 30 minutes.
Figure 13:
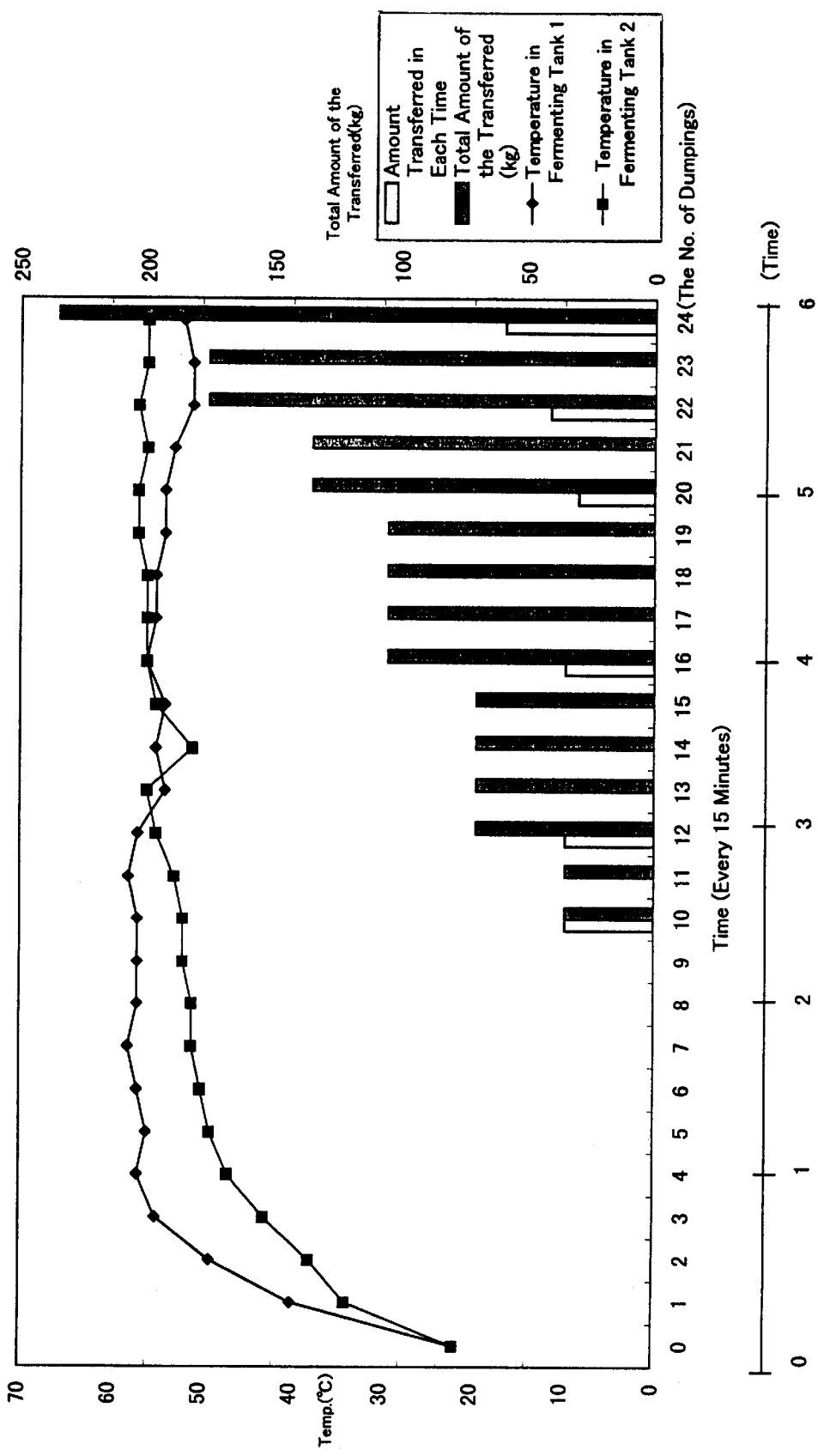
FIG. 13 is a graph showing relation between transferred amount and temperature in fermenting tank when the organic material is added in every 30 minutes.
Figure 14:
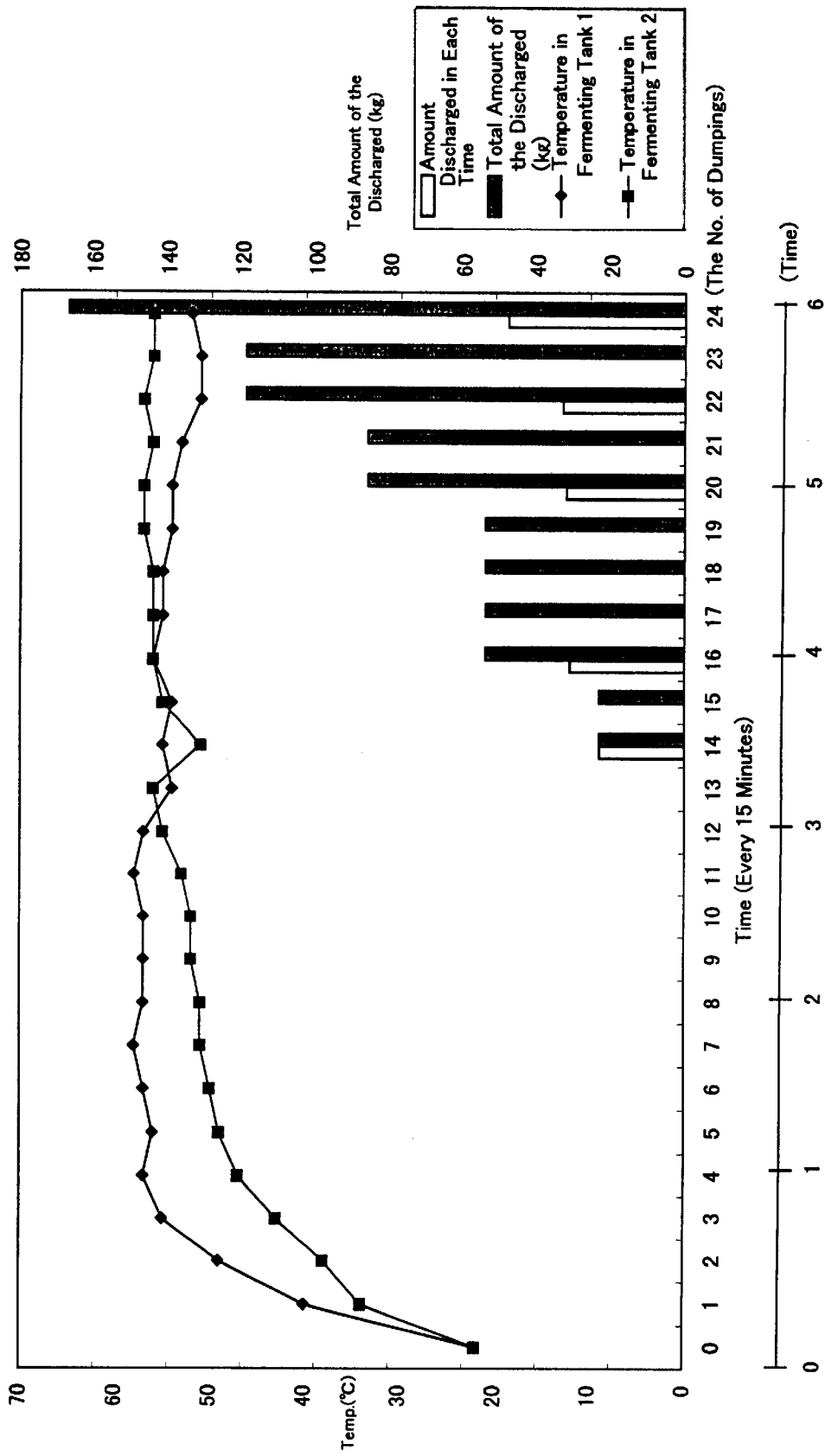
FIG. 14 is a graph showing relation between discharged amount and temperature in fermenting tank when the organic material is added in every 30 minutes.
Figure 15:
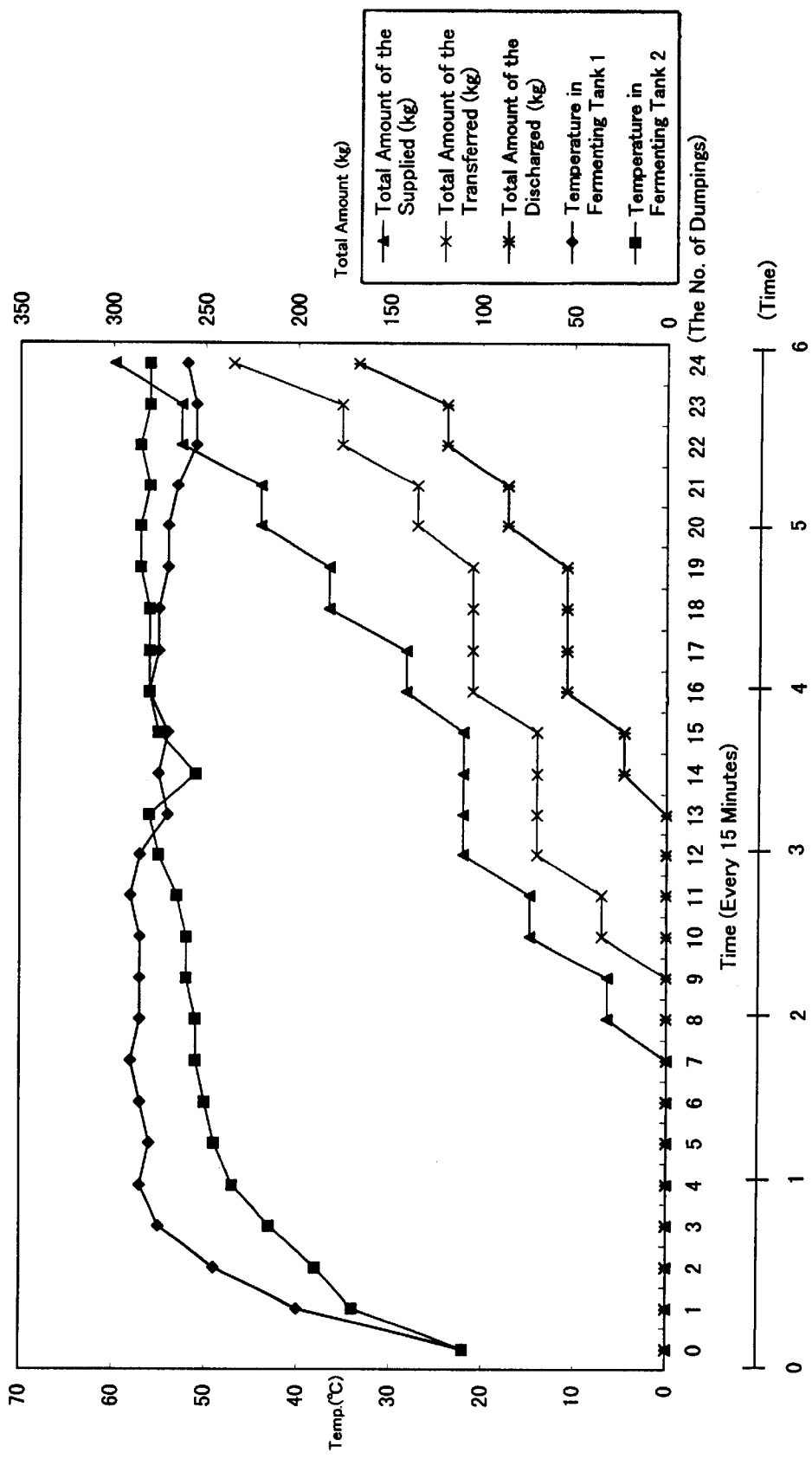
FIG. 15 is a graph showing relation between total of supplied, transferred; discharged amount and temperature in fermenting tank when the organic material is added in every 30 minutes.
Figure 16:
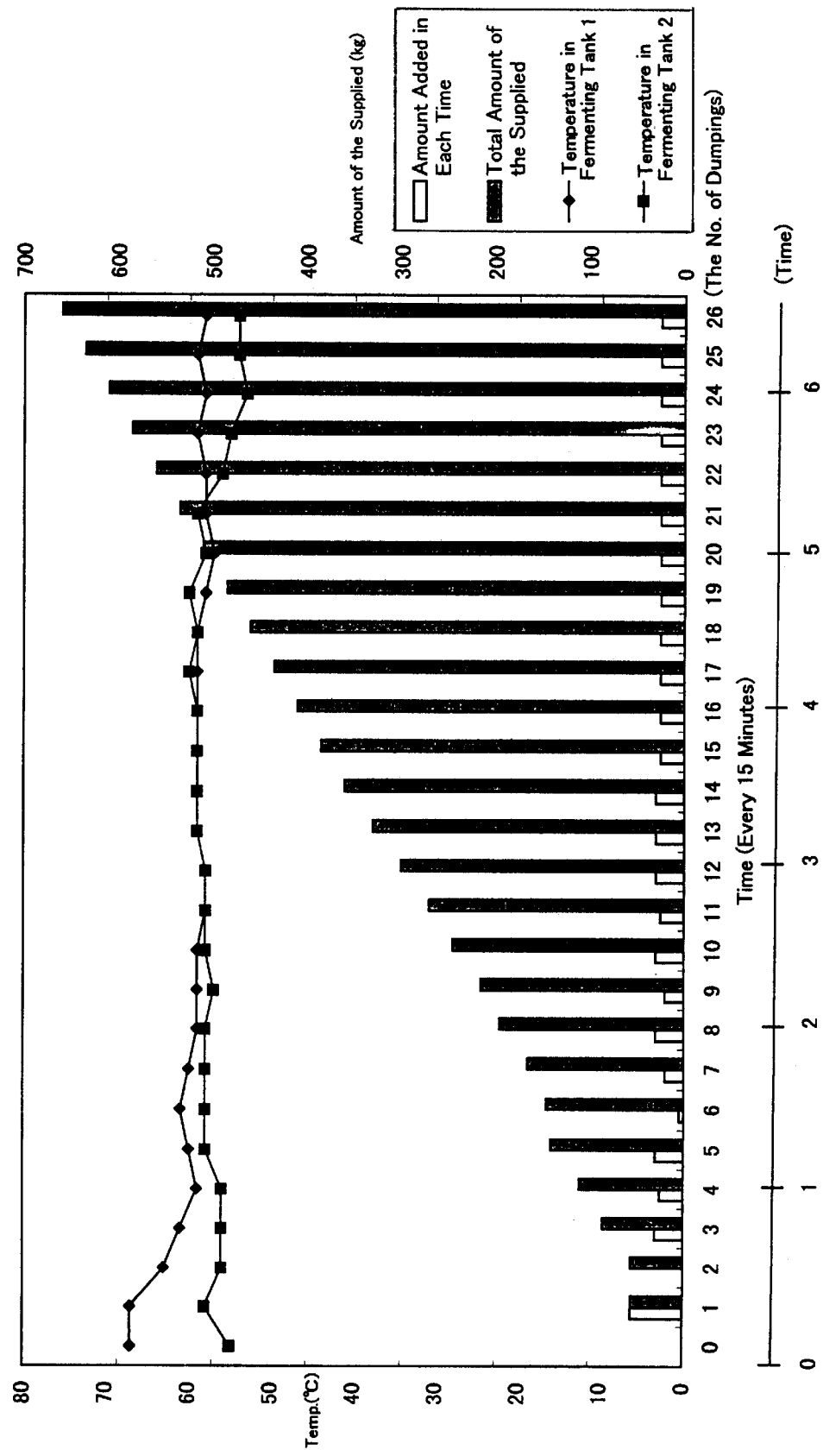
FIG. 16 is a graph showing relation between supplied amount and temperature in fermenting tank when the organic material is added in every 15 minutes.
Figure 17:
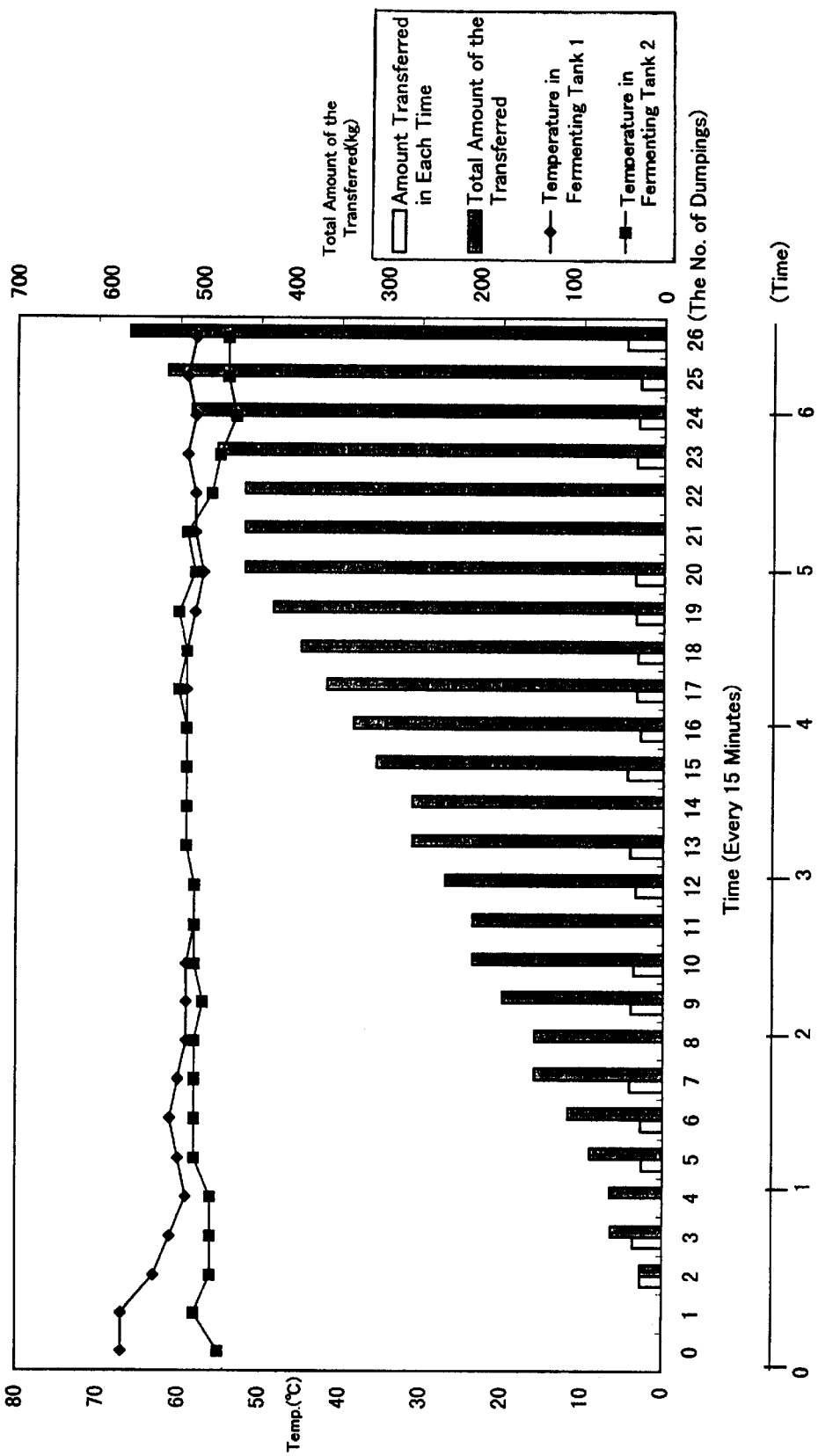
FIG. 17 is a graph showing relation between transferred amount and temperature in fermenting tank when the organic material is added in every 15 minutes.
Figure 18:
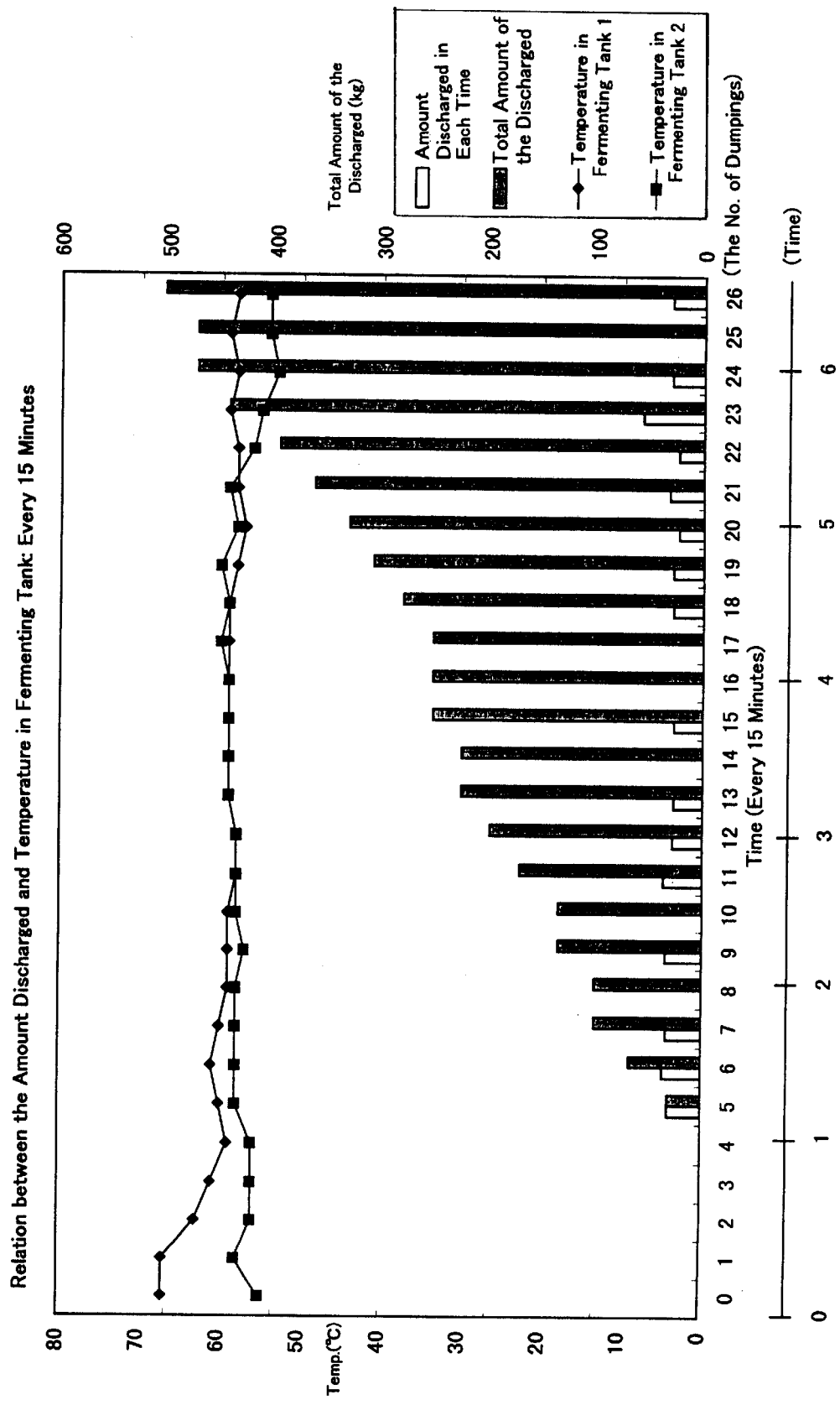
FIG. 18 is a graph showing relation between discharged amount and temperature in fermenting tank when the organic material is added in every 15 minutes.
Figure 19:
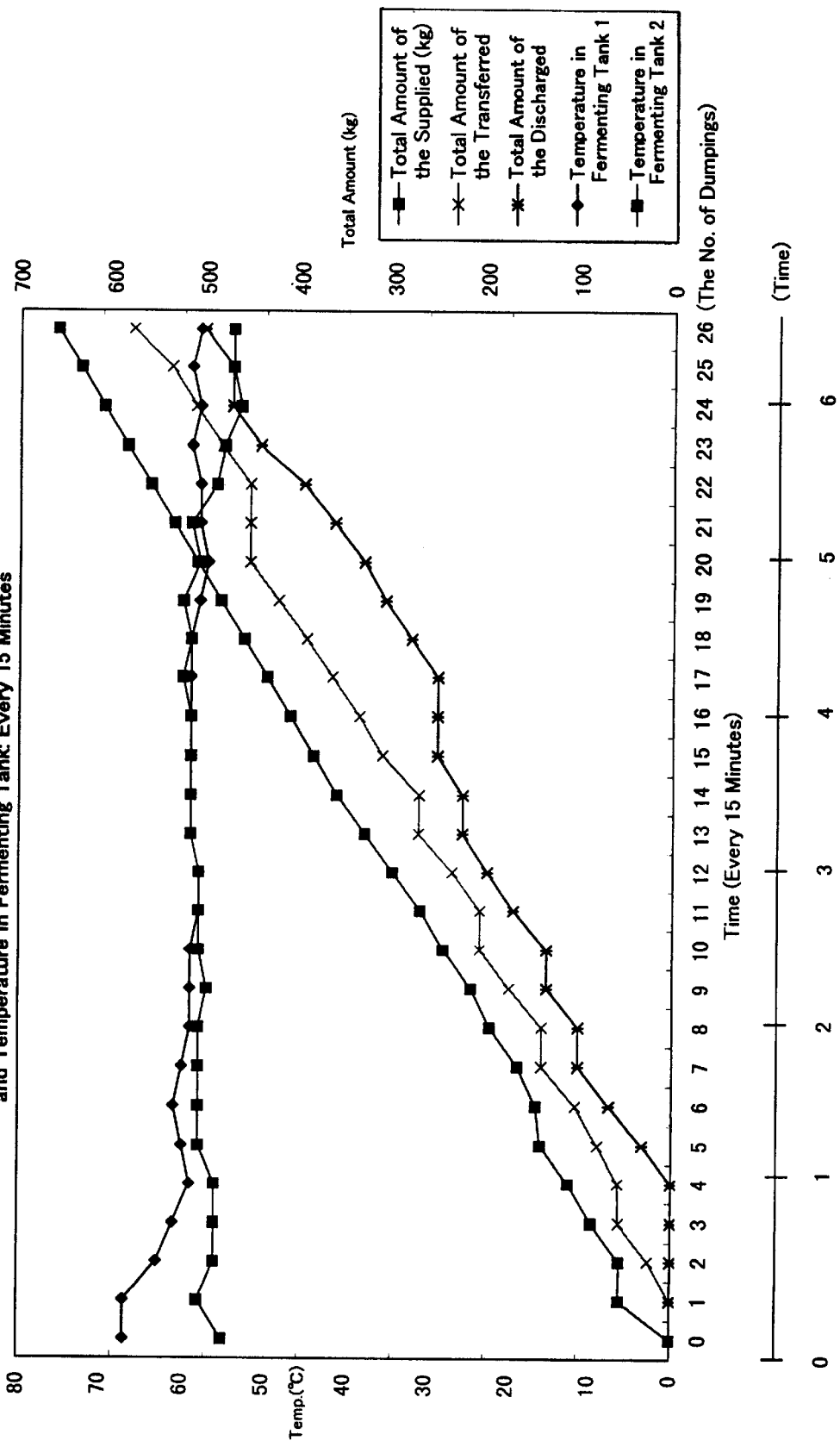
FIG. 19 is a graph showing relation between total of supplied, transferred, discharged amount and temperature in fermenting tank when the organic material is added in every 15 minutes.

Under an estimate of activation of the fermenting microorganism in the fermenting tank 10 by temperature, it is necessary to detect suitable activation temperature by supplying a certain amount of the organic material such as raw food waste and observe change of temperature in the tank. As shown in Tables 5, 6 and FIGS. 9, 10, when a certain amount of the organic material as shown in the tables was added after two hours passed, the temperature in the fermenting tank 10 rose and activation of the fermenting microorganism was maintained. At the time when two hours passed after the organic material was supplied into the fermenting tank 10 for the first time, the temperature in the tank reached at temperature of "final phase of fermentation temperature rising period" or "constant temperature period". On the other hand, when the raw food waste was added to the fermenting tank 10, fermentation of which progressed to reach "declining period", its as shown in Table 7 and FIG. 11. From these facts, it is obvious that fermentation process by fermenting microorganism is suitable and efficient when it shall proceeded in "final phase of fermentation temperature rising period" or "constant temperature period".

TABLE 5

Change of temperature when raw food waste is added in
"fermentation temperature rising period" in fermenting tank
(Relation between amount and temperature in fermenting tank)

| Time (Every 15 Minutes) | Temp. | Amount Supplied | Total of the Supplied | Total Amount (kg) |
|---|---|---|---|---|
| 0 | 49 | 0 | 0 | 300 |
| 1 | 51 | 0 | 0 | 300 |
| 2 | 52 | 0 | 0 | 300 |
| 3 | 52 | 0 | 0 | 300 |
| 4 | 52 | 0 | 0 | 300 |
| 5 | 52 | 0 | 0 | 300 |
| 6 | 52 | 0 | 0 | 300 |
| 7 | 54 | 0 | 0 | 300 |
| 8 | 54 | 0 | 0 | 300 |
| 9 | 54 | 0 | 0 | 300 |
| 10 | 52 | 20 | 20 | 320 |
| 11 | 51 | 0 | 20 | 320 |
| 12 | 53 | 20 | 40 | 340 |
| 13 | 52 | 0 | 40 | 340 |
| 14 | 52 | 20 | 60 | 360 |
| 15 | 51 | 0 | 60 | 360 |
| 16 | 51 | 20 | 80 | 380 |
| 17 | 50 | 0 | 80 | 380 |
| 18 | 52 | 20 | 100 | 400 |
| 19 | 53 | 20 | 120 | 420 |
| 20 | 53 | 20 | 140 | 460 |
| 21 | 54 | 20 | 160 | 480 |
| 22 | 53 | 0 | 160 | 480 |
| 23 | 54 | 0 | 160 | 480 |
| 24 | 60 | 0 | 160 | 480 |
| 25 | 65 | 0 | 160 | 480 |

TABLE 6

Raw food waste was added in "fermentation temperature
rising period" in fermenting tank
(Relation between weight and temperature in fermenting tank)

| Time (Every 15 Minutes) | Temp. | Amount Supplied | Total of the Supplied | Total Amount (kg) |
|---|---|---|---|---|
| 0 | 48 | 0 | 0 | 200 |
| 1 |  | 0 | 0 | 200 |
| 2 | 50 | 0 | 0 | 200 |
| 3 |  | 0 | 0 | 200 |
| 4 | 51 | 0 | 0 | 200 |
| 5 |  | 0 | 0 | 200 |
| 6 | 52 | 0 | 0 | 200 |
| 7 |  | 0 | 0 | 200 |
| 8 | 53 | 0 | 0 | 200 |
| 9 |  | 0 | 0 | 200 |
| 10 | 52 | 20 | 20 | 220 |
| 11 | 52 | 20 | 40 | 240 |
| 12 | 52 | 20 | 60 | 260 |
| 13 | 52 | 20 | 80 | 280 |
| 14 | 54 | 20 | 100 | 300 |
| 15 | 55 | 20 | 120 | 320 |
| 16 | 57 | 20 | 140 | 340 |
| 17 | 57 | 20 | 160 | 360 |
| 18 | 59 | 20 | 180 | 380 |
| 19 | 60 | 20 | 200 | 400 |
| 20 | 63 | 0 | 200 | 400 |
| 21 | 63 | 0 | 200 | 400 |
| 22 | 64 | 0 | 200 | 400 |
| 23 | 68 | 0 | 200 | 400 |
| 24 | 66 | 0 | 200 | 400 |
| 25 | 67 | 0 | 200 | 400 |
| 26 | 67 | 0 | 200 | 400 |
| 27 | 67 | 0 | 200 | 400 |
| 28 | 68 | 0 | 200 | 400 |
| 29 | 68 | 0 | 200 | 400 |

TABLE 7

Change of temperature when raw food waste is added in
"temperature declining period" in fermenting tank
(Relation between weight and temperature in fermenting tank)

| Time (Every 15 Minutes) | Temp. | Amount Supplied | Total of the Supplied | Total Amount (kg) |
|---|---|---|---|---|
| −5 | 65 | 0 | 0 | 300 |
| −4 |  | 0 | 0 | 300 |
| −3 |  | 0 | 0 | 300 |
| −2 |  | 0 | 0 | 300 |
| −1 | 57 | 0 | 0 | 300 |
| 0 | 56 | 20 | 20 | 320 |
| 1 | 53 | 0 | 20 | 320 |
| 2 | 54 | 40 | 60 | 360 |
| 3 | 48 | 0 | 60 | 360 |
| 4 | 51 | 0 | 60 | 360 |
| 5 | 49 | 0 | 60 | 360 |
| 6 | 50 | 40 | 100 | 380 |
| 7 | 47 | 0 | 100 | 380 |
| 8 | 49 | 0 | 100 | 380 |
| 9 | 51 | 0 | 100 | 380 |
| 10 | 52 | 0 | 100 | 380 |

Embodiment 1

In continuous processing apparatus 1 of the present invention as shown in FIG. 1, about 300 kg of the material was supplied or dumped into the first and second fermenting tank 10 where temperature inside tank was set at about 55° C. The processing material was made of the fermentation promoting agent and the raw food waste which has been stirred and crushed and half fermented. Further, a certain amount (for example, amount between 32 kg and 43 kg) of the processing material which was dumped into the first fermenting tank 10 in every 30 minutes. And, the processing material which was progressed to a certain fermentation level in the first fermenting tank 10 was transferred from the fermenting tank 10 to the second fermenting tank 10 by the screw converyer 30. Moreover, the compost which was fermented completely in the second fermenting tank was discharged properly by the discharging apparatus 40. Table 8 and FIGS. from 12 to 15 showed each of the respective data in the continuous processing apparatus 1. Temperature inside the first fermentation tank 10 decreased gradually but the amount to be transferred by the screw conveyer 30 was adjusted or controlled to keep temperature in the tank equal to or more than 50° C. In the second fermenting tank 10 where fermenting step should be completed, temperature in the tank transferred to gradually rise to "constant temperature period" and it always maintained at equal to or more than 55° C. The processing amount was 299 kg in four hours so it was possible to proceed 1794 kg per day.

TABLE 8

Continuous Processing: Every 30 minutes
(Initial supplied was 300 Kg)

| Time (Every 15 Minutes) | Amount Supplied | Total of the Supplied | Temp. in Fermenting Tank 1 | Amount Transferred |
|---|---|---|---|---|
| 0 | 0 | 0 | 22 | 0 |
| 1 | 0 | 0 | 40 | 0 |
| 2 | 0 | 0 | 49 | 0 |
| 3 | 0 | 0 | 55 | 0 |
| 4 | 0 | 0 | 57 | 0 |
| 5 | 0 | 0 | 56 | 0 |
| 6 | 0 | 0 | 57 | 0 |
| 7 | 0 | 0 | 58 | 0 |
| 8 | 32 | 32 | 57 | 0 |
| 9 | 0 | 32 | 57 | 0 |
| 10 | 42 | 74 | 57 | 35 |
| 11 | 0 | 74 | 58 | 0 |
| 12 | 36 | 110 | 57 | 35 |
| 13 | 0 | 110 | 54 | 0 |
| 14 | 0 | 110 | 55 | 0 |
| 15 | 0 | 110 | 54 | 0 |
| 16 | 31 | 141 | 56 | 35 |
| 17 | 0 | 141 | 55 | 0 |
| 18 | 42 | 183 | 55 | 0 |
| 19 | 0 | 183 | 54 | 0 |
| 20 | 37 | 220 | 54 | 30 |
| 21 | 0 | 220 | 53 | 0 |
| 22 | 43 | 263 | 51 | 41 |
| 23 | 0 | 263 | 51 | 0 |
| 24 | 36 | 299 | 52 | 59 |

| Time (Every 15 minutes) | Total Amount (kg) | Temp. in Fermenting Tank 2 | Amount Discharged | Total Amount (kg) |
|---|---|---|---|---|
| 0 | 0 | 22 | 0 | 0 |
| 1 | 0 | 34 | 0 | 0 |
| 2 | 0 | 38 | 0 | 0 |
| 3 | 0 | 43 | 0 | 0 |
| 4 | 0 | 47 | 0 | 0 |
| 5 | 0 | 49 | 0 | 0 |
| 6 | 0 | 50 | 0 | 0 |
| 7 | 0 | 51 | 0 | 0 |
| 8 | 0 | 51 | 0 | 0 |
| 9 | 0 | 52 | 0 | 0 |
| 10 | 35 | 52 | 0 | 0 |
| 11 | 35 | 53 | 0 | 0 |
| 12 | 70 | 55 | 0 | 0 |
| 13 | 70 | 56 | 0 | 0 |
| 14 | 70 | 51 | 23 | 23 |
| 15 | 70 | 55 | 0 | 23 |
| 16 | 105 | 56 | 31 | 54 |
| 17 | 105 | 56 | 0 | 54 |
| 18 | 105 | 56 | 0 | 54 |
| 19 | 105 | 57 | 0 | 54 |
| 20 | 135 | 57 | 32 | 86 |
| 21 | 135 | 56 | 0 | 86 |
| 22 | 176 | 57 | 33 | 119 |
| 23 | 176 | 56 | 0 | 119 |
| 24 | 235 | 56 | 48 | 167 |

Embodiment 2

The organic material such as raw food waste should be supplied or dumped into the fermenting tank 10 as in small amount as possible. This is because fermentation condition shall not change and the process shall proceed efficiently with taking environmental change of the fermenting microorganism into consideration. Therefore, in the same way as of Embodiment 1 except that supplying intervals was every 15 minutes and supplied amount was from 25 kg to 35 kg, an experiment was carried out. Table 9 and FIGS. from 16 to 19 showed each of respective data in the continuous processing apparatus 1 in this case. As obvious in these data, the organic material such as raw food waste was fermented completely at the temperature when activation of the fermentation organism was high. The processing amount was 660 kg in eight and half hours so it was possible to proceed 1852 kg per day.

TABLE 9

Continuous Processing: Every 15 minutes

| Time (Every 15 Minutes) | Amount Supplied | Total of the Supplied | Temp. in Fermenting Tank 1 | Amount Transferred |
|---|---|---|---|---|
| 0 | 0 | 0 | 67 | 0 |
| 1 | 55 | 55 | 67 | 0 |
| 2 | 0 | 55 | 63 | 24 |
| 3 | 30 | 85 | 61 | 32 |
| 4 | 25 | 110 | 59 | 0 |
| 5 | 30 | 140 | 60 | 23 |
| 6 | 5 | 145 | 61 | 24 |
| 7 | 20 | 165 | 60 | 36 |
| 8 | 30 | 195 | 59 | 0 |
| 9 | 20 | 215 | 59 | 35 |
| 10 | 30 | 245 | 59 | 32 |
| 11 | 25 | 270 | 58 | 0 |
| 12 | 30 | 300 | 58 | 30 |
| 13 | 30 | 330 | 59 | 36 |
| 14 | 30 | 360 | 59 | 0 |
| 15 | 25 | 385 | 59 | 39 |
| 16 | 25 | 410 | 59 | 25 |
| 17 | 25 | 435 | 59 | 29 |
| 18 | 25 | 460 | 59 | 28 |
| 19 | 25 | 485 | 58 | 30 |
| 20 | 25 | 510 | 57 | 31 |
| 21 | 25 | 535 | 58 | 0 |
| 22 | 25 | 560 | 58 | 0 |
| 23 | 25 | 585 | 59 | 30 |
| 24 | 25 | 610 | 58 | 28 |
| 25 | 25 | 635 | 59 | 26 |
| 26 | 25 | 660 | 58 | 41 |

| Time (Every 15 minutes) | Total Amount (kg) | Temp. in Fermenting Tank 2 | Amount Discharged | Total Amount (kg) |
|---|---|---|---|---|
| 0 | 0 | 55 | 0 | 0 |
| 1 | 0 | 58 | 0 | 0 |
| 2 | 24 | 56 | 0 | 0 |
| 3 | 56 | 56 | 0 | 0 |
| 4 | 57 | 56 | 0 | 0 |
| 5 | 79 | 58 | 31 | 31 |
| 6 | 103 | 58 | 36 | 67 |
| 7 | 139 | 58 | 33 | 100 |
| 8 | 139 | 58 | 0 | 100 |
| 9 | 174 | 57 | 34 | 134 |
| 10 | 206 | 58 | 0 | 134 |
| 11 | 206 | 58 | 36 | 170 |
| 12 | 236 | 58 | 28 | 198 |
| 13 | 272 | 59 | 27 | 225 |
| 14 | 272 | 59 | 0 | 225 |
| 15 | 311 | 59 | 27 | 252 |
| 16 | 336 | 59 | 0 | 252 |
| 17 | 365 | 60 | 0 | 252 |
| 18 | 393 | 59 | 28 | 280 |
| 19 | 423 | 60 | 28 | 308 |
| 20 | 454 | 58 | 23 | 331 |
| 21 | 454 | 59 | 32 | 363 |
| 22 | 454 | 56 | 23 | 396 |
| 23 | 484 | 55 | 57 | 443 |
| 24 | 512 | 53 | 30 | 473 |
| 25 | 538 | 54 | 0 | 473 |
| 26 | 579 | 54 | 30 | 503 |

To compare with the method of the present invention, the raw food waste was proceeded in the following method with using only the prior raw food waste processing apparatus shown in FIG. 2.

Comparison 1

This was an intermittent or batch processing method in which the raw food waste was supplied one time per day and the fermentation process had finished in some days. Total amount of the raw food waste proceeded was shown in the left column and amount of the raw food waste supplied everyday was shown in the right column of Table 10. Stirring method (time duration by number)and total amount of time were also shown in the columns of "stirring time" and "stirring method". "Number of days needed" means days needed to finish the fermentation process. For example, in the top experiment, 285 kg at first day, 93 kg at second day, and 76 kg at third (last) day were dumped in and stirred for 18 hours everyday. Therefore, total stirring time was 54 hours and three days were needed to finish the fermentation process. By dividing total processing amount 9369 kg by total number of 63 days, 148 kg per day (12 kg per hour) were obtained as an average of the processing amount.

TABLE 10

Addition and Batch Processing Method: Several days

| Days Needed | Stirring Hours | Stirring Method | Amount Supplied in Each Day (kg) |
|---|---|---|---|
| 3 | 54 | 18 × 3 | 285, 93, 76 |
| 5 | 72 | 18 × 4 | 252, 132, 69, 186, 11 |
| 6 | 88 | 18 × 2 + 14 × 4 | 297, 118, 40, 105, 89, 30 |
| 5 | 60 | 14 × 5 | 337, 170, 54, 65, 33 |
| 5 | 62 | 14 × 3 + 20 | 240, 86, 168 |
| 5 | 52 | 14 × 3 + 10 | 393, 127, 80 |
| 5 | 59 | 14 + 10 × 3 + 15 | 321, 135, 20, 150, 56 |
| 4 | 34 | 10 × 3 + 4 | 283, 110, 145, 51 |
| 2 | 36 | 18 × 2 | 289 |
| 3 | 30 | 10 × 3 | 375, 60, 178 |
| 4 | 40 | 10 × 4 | 319, 148, 100, 60 |
| 4 | 40 | 10 × 4 | 283, 147, 250, 64 |
| 4 | 28 | 6 × 3 + 10 | 345, 146, 144, 60 |
| 5 | 50 | 10 × 3 + 15 + 5 | 383, 119, 134, 151, 25 |
| 4 | 36 | 8 × 2 + 10 × 2 | 417, 40, 125, 136 |

Average Amount of Processing
Amount/Day 146 (kg)
Amount/Hour 12 (kg)
Total Amount (kg) = 9369
Total Days = 63
Total Stirring Hours = 741

Comparison 2

This was a method in which all raw food waste was supplied or dumped at once and it took two days for the fermentation process. As shown in Table 11, by dividing total processing amount of 2674 kg by total number of 15 days, 178 kg per day (13 kg per hour) was obtained as an average of the processing amount.

TABLE 11

INITIAL SUPPLY AND 2 DAYS PROCESSING

| Total Amount (kg) | Days Needed | Stirring Hours | Stirring Method |
|---|---|---|---|
| 410 | 2 | 18 | 7 + 11 |
| 370 | 2 | 32 | 16 + 16 |
| 390 | 2 | 23 | 20 + 13 |
| 392 | 3 | 37 | 10 + 24 + 3 |
| 352 | 2 | 27 | 18 + 9 |
| 419 | 2 | 36 | 14 + 2 |
| 341 | 2 | 27 | 13 + 4 |

Average Amount of Processing
Amount/Day 178 (kg)
Amount/Hour 13 (kg)
Total Amount (kg) = 2674
Total Days = 15
Total Stirring Hours = 200

Comparison 3 this was a method in which all raw food waste was supplied or dumped at once and it took one day for the fermentation process after continuous stirring. As shown in Table 12, by dividing total processing amount of 6559 kg by total number of 14 days, 468 kg per day (31 kg per hour) was obtained as an average of the processing amount.

TABLE 12

INITIAL SUPPLY AND CONTINUOUS STIRRING PROCESSING

| Total Amount (kg) | Days Needed | Stirring Hours |
|---|---|---|
| 498 | 1 | 12 |
| 609 | 1 | 24 |
| 478 | 1 | 12 |
| 478 | 1 | 12 |
| 485 | 1 | 21 |
| 429 | 1 | 12 |
| 413 | 1 | 12 |
| 507 | 1 | 14 |
| 415 | 1 | 11 |
| 347 | 1 | 21 |
| 494 | 1 | 21 |
| 443 | 1 | 12 |
| 504 | 1 | 12 |
| 459 | 1 | 12 |

Average Amount of Processing
Amount/Day 468 (kg)
Amount/Hour 31 (kg)
Total Amount (kg) = 6559
Total Days = 14
Total Stirring Hours = 208

Compared to the above comparisons, in the Embodiment 1 according to the present invention, 1794 kg/2=897 kg (two fermenting tanks 10 were used, so divided by two to get the processing amount per tank) of the processing amount was obtained, and in Embodiment 2, 1852 kg/2=926 kg was obtained. Accordingly, the processing amount increased remarkably.

The present invention also has an advantage of stable composting of the organic material by high temperature period fermentation process because it can activate the fermenting microorganism in the fermenting tank. Moreover, it can get rid of non-operation time of the apparatus by 24 hour-continuous processing and, furthermore, if processes from temperature management to transfer of the processing material were computerized, it would become an automatic system and handling would be dramatically easy. As a worker's job, it is enough to just dump the organic matter such as raw food waste when it yields into the tank. And environmental hygiene gets better because flies etc. would not occur in all processes done in such closed space. Capacity of the fermenting tank is enough if it has half of the processing amount of the raw food waste, so a facility becomes small. Therefore, both facility cost and running cost may decrease remarkably. Further, even if any of the fermenting tanks 10 of the continuous processing apparatus 1 breaks down, it is possible to operate the apparatus using the remaining fermenting tank 10, so it has adaptability to emergency.

Accordingly, the present invention provides a method for continuously processing organic material, which comprises the steps of:

jointly disposing at least two fermenting tanks in series with at least one stirring apparatus and at least one temperature detector;

supplying a certain amount of processing material into the first fermenting tank, said processing material being made by stirring and crushing the fermentation promoting agent in which microorganism is implanted in advance within an organic material such as raw food waste;

detecting temperature in each of the fermenting tanks and controlling amount of the half fermented material to be transferred from the fermenting tank positioned at upper stream to the fermenting tank positioned at lower stream such that the temperature in each of the fermenting tank maintains at temperature of "final phase of fermentation heat rising period" or "constant temperature period"; and discharging the composted organic material from the last fermenting tank properly when the processing material has been composted.

Therefore, fermentation progress of each of the fermenting tanks is able to proceed evenly. Further, amount of the half fermented material to be transferred from the fermenting tank positioned at upper stream to the fermenting tank positioned at lower stream is adjusted or controlled to maintain at temperature of "final phase of fermentation heat rising period" or "constant temperature period" in each of the fermenting tanks, so the organic material is composted in short time with using the fermenting microorganism activation efficiently. Accordingly, it becomes possible for the organic material to be continuously fermented.

What is claimed is:

1. An apparatus for continuously processing organic material, comprising:

at least two fermenting tanks disposed in series, with the first fermenting tank being upstream of the second fermenting tank in processing direction, each of said fermenting tanks having at least one stirring apparatus and at least one temperature detector;

a supplying tank for stirring and crushing fermentation promoting agent with fermenting microorganisms implanted therein with organic material such as raw food waste input to said supplying tank, said supplying tank having a supplying conveyor for supplying a certain amount of stirred and crushed and fermenting organic material into the first fermenting tank, and said first fermenting tank having a transferring conveyor which transfers half-fermented organic material from the first fermenting tank to the second fermenting tank;

a controller which detects the temperature measured by the temperature detector in each fermenting tank and adjusts the amount of half-fermented material to be transferred from the first fermenting tank to the second fermenting tank such that the temperature of the organic material in each fermenting tank is maintained at a temperature of "final phase of fermentation heat rising period" or "constant temperature period" for a given fermenting cycle of the organic material; and a discharging apparatus which discharges composted organic material from the second fermenting tank when the organic material has been fermented therein, wherein said supplying tank includes a high capacity storage tank body which has more capacity than the organic material to be dumped therein, and an organic material dumping apparatus which dumps the organic material into the storage tank body while draining water therefrom, and wherein inside of the storage tank body are provided a stirring pipe formed with crushing holes and a stirring screw located in said stirring pipe which sends up accumulated organic material on the bottom of the storage tank body and scatters some of the organic material through the crushing holes of the stirring pipe and other organic material through the upper end of the stirring pipe into the storage tank body again.

2. An apparatus for continuously processing organic material, comprising:

at least two fermenting tanks disposed in series, with the first fermenting tank being upstream of the second fermenting tank in processing direction, each of said fermenting tanks having at least one stirring apparatus and at least one temperature detector;

a supplying tank for stirring and crushing fermentation promoting agent with fermenting microorganisms implanted therein with organic material such as raw food waste input to said supplying tank, said supplying tank having a supplying conveyor for supplying a certain amount of stirred and crushed and fermenting organic material into the first fermenting tank, and said first fermenting tank having a transferring conveyor which transfers half-fermented organic material from the first fermenting tank to the second fermenting tank;

a controller which detects the temperature measured by the temperature detector in each fermenting tank and adjusts the amount of half-fermented material to be transferred from the first fermenting tank to the second fermenting tank such that the temperature of the organic material in each fermenting tank is maintained at a temperature of "final phase of fermentation heat rising period" or "constant temperature period" for a given fermenting cycle of the organic material; and a discharging apparatus which discharges composted organic material from the second fermenting tank when the organic material has been fermented therein, wherein said supplying tank includes a high capacity storage tank body which has more capacity than the organic material to be dumped therein, and an organic material dumping apparatus which dumps the organic material into the storage tank body while draining water therefrom, and said storage tank body is comprised of an upper cylindrical part and a lower cut-end conic part which tapers off and is closed at the bottom by a bottom wall, and inside of said storage tank body are located an inner pipe having a small diameter going up from a certain point above the center of said bottom wall, a mesh cylinder having a large diameter jointly located at the upper end of the inner pipe, a rotation axis which goes through from the bottom wall to the upper end of the mesh cylinder, said rotation axis having a spiral wing capable of raising accumulated organic material at the cut-end conic part to the mesh cylinder, cutter members fixed at proper points of the rim of the spiral wing, and cutter die members fixed to inside of the mesh cylinder and positioned next to the cutter members.

* * * * *